(12) United States Patent
Woo et al.

(10) Patent No.: US 8,830,411 B2
(45) Date of Patent: Sep. 9, 2014

(54) ARRAY SUBSTRATE AND METHOD OF MANUFACTURING THE SAME

(75) Inventors: Hwa-Sung Woo, Suwon-si (KR); Joo-Nyung Jang, Gyeongsan-si (KR); Cheol Shin, Hwaseong-si (KR); Yoon-Sung Um, Yongin-si (KR); Mi-Jeong Song, Suwon-si (KR)

(73) Assignee: Samsung Display Co., Ltd. (KR)

( * ) Notice: Subject to any disclaimer, the term of this patent is extended or adjusted under 35 U.S.C. 154(b) by 236 days.

(21) Appl. No.: 12/469,429

(22) Filed: May 20, 2009

(65) Prior Publication Data

US 2010/0182523 A1 Jul. 22, 2010

Related U.S. Application Data

(63) Continuation-in-part of application No. 12/364,858, filed on Feb. 3, 2009, now Pat. No. 8,169,559.

(30) Foreign Application Priority Data

Jan. 16, 2009 (KR) .......................... 10-2009-0003560
Apr. 15, 2009 (KR) .......................... 10-2009-0032787

(51) Int. Cl.
*G02F 1/1343* (2006.01)
*G02F 1/136* (2006.01)

(52) U.S. Cl.
USPC ................... 349/41; 349/39; 349/40; 345/96; 345/98

(58) Field of Classification Search
USPC ....................... 349/39–41, 139; 345/87, 96, 98
See application file for complete search history.

(56) References Cited

U.S. PATENT DOCUMENTS

| | | | | |
|---|---|---|---|---|
| 5,748,165 A | * | 5/1998 | Kubota et al. | 345/96 |
| 6,256,076 B1 | * | 7/2001 | Bae et al. | 349/38 |
| 7,468,719 B2 | | 12/2008 | Kawachi | |
| 8,633,884 B2 | * | 1/2014 | Baek et al. | 345/96 |
| 2002/0084969 A1 | | 7/2002 | Ozawa | |
| 2005/0174313 A1 | | 8/2005 | Kawachi | |

(Continued)

FOREIGN PATENT DOCUMENTS

| | | |
|---|---|---|
| EP | 2209042 B1 | 6/2012 |
| GB | 2 431 279 A | 4/2007 |
| JP | 2005258416 A | 9/2005 |
| WO | 03/083815 A2 | 10/2003 |

OTHER PUBLICATIONS

European Search Report for Application No. 09002266.6-2205 dated Jun. 2, 2010.

(Continued)

*Primary Examiner* — Huyen Ngo
(74) *Attorney, Agent, or Firm* — Cantor Colburn LLP

(57) ABSTRACT

In an array substrate and a method of manufacturing the array substrate, an array substrate includes a first switching element, a second switching element, a third switching element and a fourth switching element. The first switching element is electrically connected to a first data line. The second switching element is electrically connected to a second data line adjacent to the first data line. The third switching element is electrically connected to a data power line interposed between the first and second data lines. The fourth switching element is electrically connected to a gate power line receiving a voltage having different polarity from a voltage applied to the data power line. Therefore, light transmittance, opening ratio and display quality are improved.

4 Claims, 18 Drawing Sheets

(56) References Cited

U.S. PATENT DOCUMENTS

2005/0190133 A1* 9/2005 Kawachi .................. 345/87
2006/0001815 A1   1/2006 Kim et al.
2006/0227273 A1   10/2006 Shin et al.
2006/0227276 A1   10/2006 Son
2007/0057892 A1* 3/2007 Shin et al. ................ 345/96
2007/0080370 A1   4/2007 Miyachi et al.
2008/0246720 A1   10/2008 Lee et al.
2011/0096278 A1* 4/2011 Kim et al. ................ 349/139
2011/0221988 A1* 9/2011 Cho et al. ................. 349/41

OTHER PUBLICATIONS

European Office Action for Application No. 09 007 238.0-2205 dated Sep. 27, 2011.
Extended European Search Report for Application No. 12179844.1-2205 dated Nov. 27, 2012.
Search Report-European Application No. 13173729 issued from European Patent Office on Jan. 14, 2014.
European Examination Report for Application No. 09 007 238.0—2205 dated Feb. 10, 2012.

* cited by examiner

US 8,830,411 B2

ARRAY SUBSTRATE AND METHOD OF MANUFACTURING THE SAME

PRIORITY STATEMENT

This application is a Continuation-in-Part of U.S. patent application Ser. No. 12/364,858, filed on Feb. 3, 2009, and claims priority under 35 USC §119 to Korean Patent Application No. 2009-3560, filed on Jan. 16, 2009 and Korean Patent Application No. 2009-32787, filed on Apr. 15, 2009 in the Korean Intellectual Property Office (KIPO), the contents of which are herein incorporated by reference in their entirety.

BACKGROUND OF THE INVENTION

1. Field of the Invention

Example embodiments of the present invention relate to an array substrate and a method of manufacturing the array substrate. More particularly, example embodiments of the present invention relate to an array substrate capable of light transmittance, opening ratio and optical characteristics and a method of manufacturing the array substrate.

2. Description of the Related Art

A liquid crystal display (LCD) device that is one of flat panel display devices has been widely used in various fields. The LCD device includes an array substrate having a pixel electrode and an opposite substrate having a common electrode to form an electric field. Also, the LCD device further includes a liquid crystal layer interposed between the array substrate and the opposite substrate.

When a voltage difference is applied to the pixel electrode and the common electrode, an electric field is formed between the pixel electrode and the common electrode. Liquid crystals of the liquid crystal layer vary arrangement in response to the electric field applied thereto, and thus light transmittance of the liquid crystal layer is changed by controlling polarization of an incident light, thereby displaying an image.

The LCD device also controls a switching element electrically connected to each of the pixel electrodes, and a plurality of signal lines such as a gate line and a data line to apply the voltage to the pixel electrode.

The LCD device receives an input image signal from an externally provided graphic controller. The input image signal includes luminance information of the pixels.

Each of the pixels receives a data voltage corresponding to the luminance information. Each of pixels of the LCD device displays an image of a luminance corresponding to a gray-scale of the image signal based on the pixel voltage difference between the data voltage applied to the pixel and a common voltage applied to the common electrode. The range of the pixel voltage difference applied to the pixel and common electrodes is predetermined by a driving part of the LCD device.

The driving part of the LCD device may be directly mounted on the array substrate as a chip type, or may be attached to the array substrate using a flexible circuit film. The integrated circuit chip is expensive in manufacturing the LCD device.

In order to reduce the manufacturing cost, the range of the pixel voltage difference is restricted. Also, parasite capacitance may be formed between the data lines, so that image display quality of the LCD device may be deteriorated.

In addition, when the number of the gate and data lines on the array substrate is increased, opening ratio of the display device is decreased.

SUMMARY OF THE INVENTION

Example embodiments of the present invention provide an array substrate capable of light transmittance, opening ratio and optical characteristics.

Example embodiments of the present invention provide a method of manufacturing the above-mentioned array substrate.

According to one aspect of the present invention, an array substrate includes a first switching element, a second switching element, a third switching element and a fourth switching element. The first switching element is electrically connected to a first data line. The second switching element is electrically connected to a second data line adjacent to the first data line. The third switching element is electrically connected to a data power line interposed between the first and second data lines. The fourth switching element is electrically connected to a gate power line receiving a voltage having different polarity from a voltage applied to the data power line.

Voltages having opposite polarities may be applied to the first and second data lines, respectively.

The array substrate may further include a first gate line substantially parallel with the gate power line, a first pixel electrode electrically connected to the first switching element, a second pixel electrode electrically connected to the second switching element, a first common electrode electrically connected to the third switching element, and a second common electrode electrically connected to the fourth switching element. The first pixel electrode and the first common electrode may be disposed in a first pixel region, and the second pixel electrode and the second common electrode may be disposed in a second pixel region adjacent to the first pixel region along the first gate line.

The array substrate may further include a fifth switching element electrically connected to the first data line, a sixth switching element electrically connected to the second data line, a seventh switching element electrically connected to the gate power line, and an eighth switching element electrically connected to the data power line.

The array substrate may further include a first gate line extended in a direction substantially parallel with the gate power line, a third pixel electrode electrically connected to the fifth switching element, a fourth pixel electrode electrically connected to the sixth switching element, a third common electrode electrically connected to the seventh switching element, and a fourth common electrode electrically connected to the eighth switching element. The third pixel electrode and the third common electrode may be disposed in a third pixel region adjacent to the first pixel region along the first data line, and the fourth pixel electrode and the fourth common electrode may be disposed in a fourth pixel region adjacent to the second pixel region along the first data line.

The array substrate may further include a first gate line extended in a direction substantially parallel with the gate power line, and a second gate line adjacent to the first gate line. The first, second, third and fourth switching elements may be electrically connected to the first gate line, and the fifth, sixth, seventh and eighth switching elements may be electrically connected to the second gate line.

Each of the first and second pixel electrodes and the first and second common electrodes may include a plurality of branching parts. The branching part of the first pixel electrode may alternate with the branching part of the first common electrode, and the branching part of the second pixel electrode may alternate with the branching part of the second common electrode.

According to another aspect of the present invention, there is provided a method of manufacturing an array substrate as follows. A gate line and a gate power line substantially parallel with the gate line are formed. A first data line, a second data line and a data power line may be interposed between the first data line and the second data line. A first switching element electrically connected to the first data line and the gate line, a second switching element electrically connected to the second data line and the gate line, a third switching element electrically connected to the data power line and the gate line, and a fourth switching element electrically connected to the gate power line and the gate line are formed. The gate power line receives a voltage having different polarity from a voltage applied to the data power line.

A first pixel electrode electrically connected to the first switching element, a second pixel electrode electrically connected to the second switching element, a first common electrode electrically connected to the third switching element and a second common electrode electrically connected to the fourth switching element may further be formed. The first pixel electrode and the first common electrode may be formed in a first pixel region, and the second pixel electrode and the second common electrode may be formed in a second pixel region adjacent to the first pixel region along the gate line.

The first, second, third and fourth switching elements may be formed by forming a fifth switching element electrically connected to the first data line, a sixth switching element electrically connected to the second data line, a seventh switching element electrically connected to the gate power line, and an eighth switching element electrically connected to the data power line.

According to still another aspect of the present invention, an array substrate includes a first pixel electrode, a second pixel electrode, a first common electrode and a second common electrode. The first pixel electrode is overlapped with first and second power lines extended along a gate line. The first and second power lines receive voltages having different polarities, respectively. The first pixel electrode is electrically connected to a first data line. The second pixel electrode is overlapped with the first and second power lines. The second pixel electrode is electrically connected to a second data line receiving a voltage having an opposite polarity to a voltage applied to the first data line. The first common electrode is overlapped with the first and second power lines, and is electrically connected to the first power line. The second common electrode is overlapped with the first and second power lines, and is electrically connected to the second power line.

A capacitance of each of first storage capacitors formed by overlapping the first and second pixel electrodes and the first and second common electrodes with the first power line may be substantially the same as a capacitance of each of second storage capacitors formed by overlapping the first and second pixel electrodes and the first and second common electrodes with the second power line.

The first common electrode may be partially overlapped with the first and second data lines.

The array substrate may further include a third data line adjacent to the second data line. The second common electrode may be partially overlapped with the second and third data lines, and the first and second common electrodes may be overlapped with first and second regions of the second data line, respectively. The first region may have substantially the same size as the second region. The first and second pixel electrodes and the first and second common electrodes may form a V-shape.

The first and second pixel electrodes may include a plurality of first bending branches, and the first and second common electrodes comprise a plurality of second bending branches. The first bending branches of the first pixel electrode may alternate the second bending branches of the first common electrode, and the first bending branches of the second pixel electrode may alternate the second bending branches of the second common electrode. A distance between adjacent first and second bending branches adjacent to the first data line or the third data line may be greater than a distance between adjacent first and second bending branches adjacent to a center between the first and second data lines and a center between the second and third data lines.

According to further still another aspect of the present invention, a method of manufacturing an array substrate is provided as follows. A gate line, a first power line and a second power line are formed. The gate line and the first and second power lines are substantially parallel with each other. A first data line and a second data line are adjacent to the first data line. The second data line receives a voltage having opposite polarity to a voltage applied to the first data line. The first and second data lines are substantially parallel with each other. A first pixel electrode electrically connected to the first data line, a second pixel electrode electrically connected to the second data line, a first common electrode electrically connected to the first power line and a second common electrode electrically connected to the second power line are formed. The first and second pixel electrodes and the first and second common electrodes are overlapped with the first and second power lines.

According to further still another aspect of the present invention, an array substrate includes a pixel electrode and a common electrode. The pixel electrode is electrically connected to a first data line. The common electrode is electrically connected to a second data line receiving a voltage having opposite polarity to a voltage applied to the first data line. The common electrode is overlapped with the first and second data lines and being adjacent to the first data line.

An overlapped area between the common electrode and the first data line may be substantially the same as an overlapped area between the common electrode and the second data line.

According to further still another aspect of the present invention, a method of manufacturing an array substrate is provided as follows. A first data line and a second data line adjacent to the first data line are formed. The second data line receives a voltage having opposite polarity to a voltage applied to the first data line. A pixel electrode electrically connected to the first data line and a common electrode electrically connected to the second data line are formed. The pixel electrode and the common electrode are overlapped with the first and second data lines.

According to some example embodiments of the present invention, the range of the pixel voltage difference is increased by the power lines receiving the various voltages, so that light transmittance of the array substrate may be increased.

Also, the storage capacitors are formed using the power lines, so that opening ratio of the array substrate is increased.

In addition, a parasite capacitor that may be generated in the data lines by overlapping between the data lines and the pixel electrodes receiving different voltages may be prevented, so that image display quality of the array substrate may be increased.

BRIEF DESCRIPTION OF THE DRAWINGS

The above and other features and advantages of the present invention will become more apparent by describing in detailed example embodiments thereof with reference to the accompanying drawings.

DETAILED DESCRIPTION OF THE INVENTION

Figure 1:
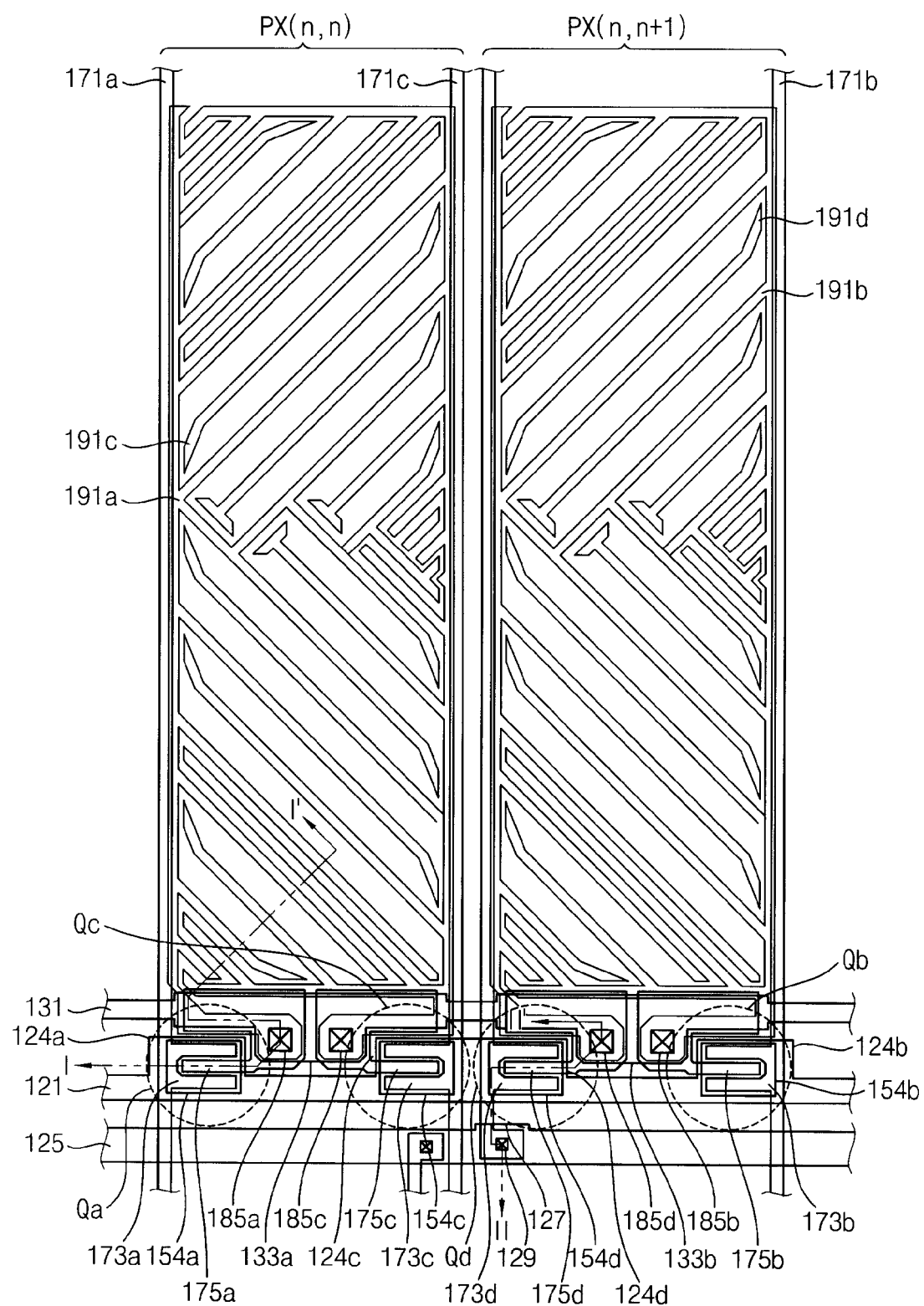
FIG. 1 is a plan view illustrating a liquid crystal display (LCD) device in accordance with one embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to", "adjacent" or "coupled to" another element or layer, it can be directly on, connected, adjacent or coupled to the other element or layer or intervening elements or layers may be present. In contrast, when an element is referred to as being "directly on," "directly connected to", "directly adjacent to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another different element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
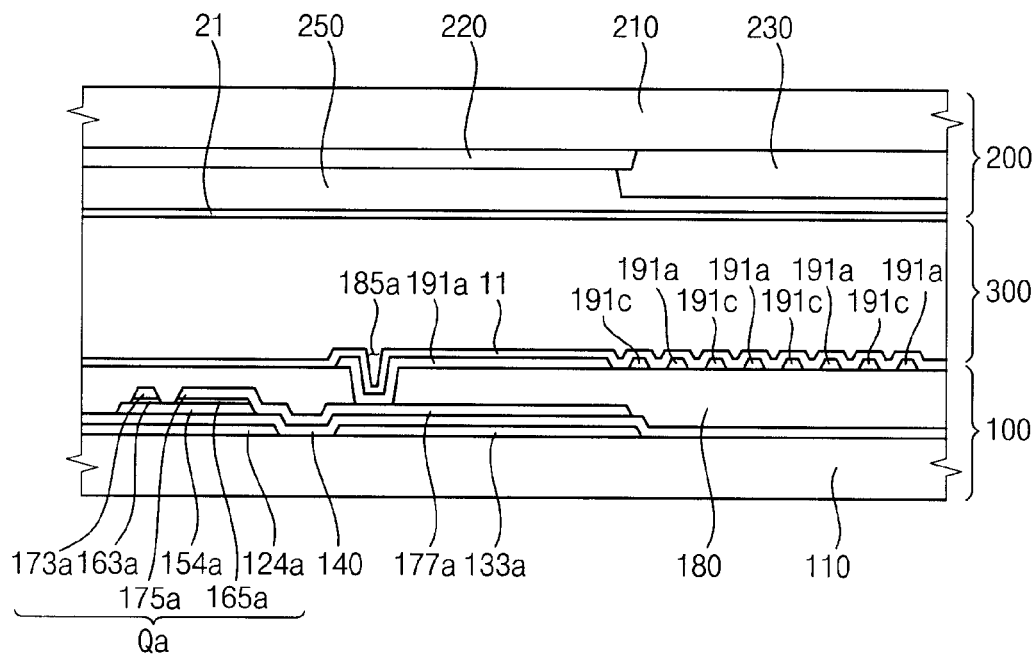
FIG. 2 is a cross-sectional view taken along a line I-I' shown in FIG. 1.
Figure 3:
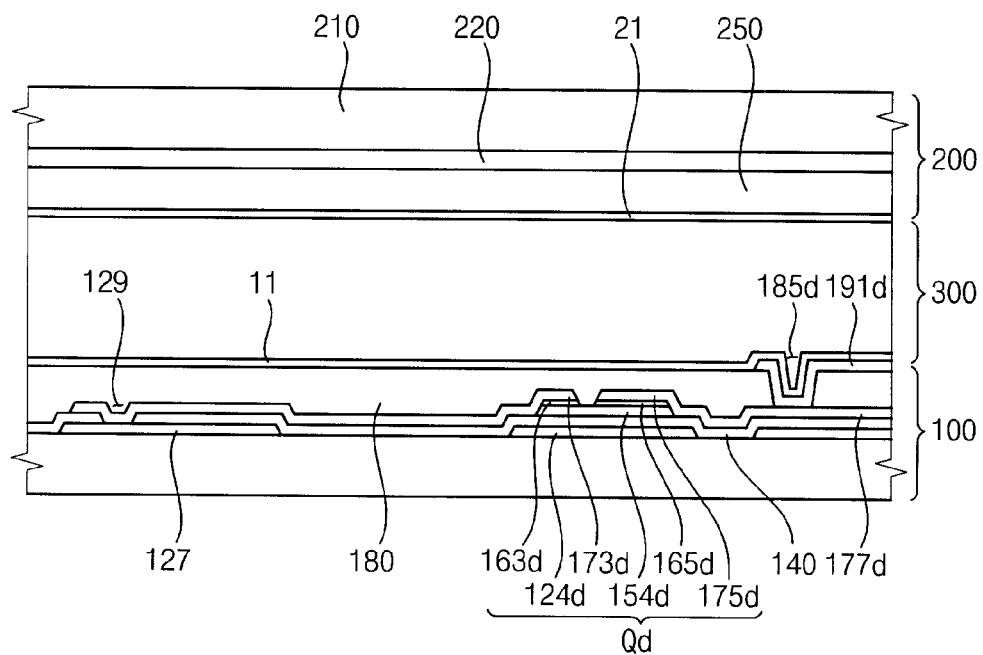
FIG. 3 is a cross-sectional view taken along a line II-II' shown in FIG. 1.

FIG. 1 is a plan view illustrating a liquid crystal display (LCD) device in accordance with one embodiment of the present invention. FIG. 2 is a cross-sectional view taken along a line I-I' shown in FIG. 1. FIG. 3 is a cross-sectional view taken along a line II-II' shown in FIG. 1.

Referring to FIGS. 1 to 3, the LCD device includes an array substrate 100, an opposite substrate 200 and a liquid crystal layer 300. In FIG. 1, a first pixel PX(n,n) and a second pixel PX(n,n+1) of the LCD device are illustrated.

The array substrate 100 includes a lower base substrate 110. A pixel region is defined in the lower base substrate 110.

The lower base substrate 110 has a plate shape. A transparent material that may be used for the lower base substrate 110 may include glass, quartz, synthetic resin, etc. These may be used alone or in a combination thereof.

A gate metal layer is formed on the lower base substrate 110. The gate metal layer may include a gate line 121, a gate power line 125 and a storage line 131.

The gate line 121 is extended in a longitudinal direction to transmit a gate signal. Each of the gate lines 121 includes a first gate electrode 124a, a second gate electrode 124b, a third gate electrode 124c and a fourth gate electrode 124d that are upwardly protruded. The first and third gate electrodes 124a and 124c correspond to the first pixel PX(n,n). The second and fourth gate electrodes 124b and 124d correspond to the second pixel PX(n,n+1).

The storage line 131 receives a voltage such as a common voltage, and is extended in the longitudinal direction. Each of the storage lines 131 is interposed between two adjacent gate lines 121, and is adjacent to a lower gate line 121 of the two adjacent gate lines 121. The storage line 131 includes a first storage electrode 133a and a second storage electrode 133b. The first storage electrode 133a corresponds to the first pixel PX(n,n), and the second storage electrode 133b corresponds to the second pixel PX(n,n+1).

The gate power line 125 transmits a power voltage or a ground voltage in each frame. The gate power line 125 may be extended in the longitudinal direction, and each of the gate power line 125 includes a gate power line 127 upwardly protruded.

Each of the first and second storage electrodes 133a and 133b has a rectangular shape having two chamfered corners adjacent to a lower side. Alternatively, each of the first and second storage electrodes 133a and 133b may have various shapes and various arrangements.

The gate insulating layer 140 is formed on the lower base substrate 110 to cover the gate line 121, the first, second, third and fourth gate electrodes 124a, 124b, 124c and 124d, the storage line 131 and the first and second storage electrodes 133a and 133b.

A first semiconductor layer 154a, a second semiconductor layer 154b, a third semiconductor layer 154c and a fourth semiconductor layer 154d are formed on the gate insulating layer 140. The first, second, third and fourth semiconductor layers 154a, 154b, 154c and 154d may include hydrogenated amorphous silicon, polycrystalline silicon, etc. The first, second, third and fourth semiconductor layers 154a, 154b, 154c and 154d are formed on the first, second, third and fourth gate electrodes 124a, 124b, 124c and 124d, respectively.

Two first ohmic contact layers 163a and 165a are formed on the first semiconductor layers 154a. Two second ohmic contact layers 163b and 165b are formed on the second semiconductor layers 154b. Two third ohmic contact layers 163c and 165c are formed on the third semiconductor layers 154c. Two fourth ohmic contact layers 163d and 165d are formed on the fourth semiconductor layers 154d. The first to fourth ohmic contact layers 163a, 163b, 163c, 163d, 165a, 165b, 165c and 165d may include n+ hydrogenated amorphous silicon that is implanted by n type impurities at a high concentration, silicide, etc.

A data metal layer including a first data line 171a, a second data line 171b, a data power line 171c, a first drain electrode 175a, a second drain electrode 175b, a third drain electrode 175c and a fourth drain electrode 175d is formed on the first to fourth ohmic contact layers 163a, 163b, 163c, 163d, 165a, 165b, 165c and 165d and the gate insulating layer 140.

The first and second data lines 171a and 171b transmit data signals. The data power line 171c transmits a driving voltage or a ground voltage by a frame. When the driving voltage is applied to the data power line 171c, the ground voltage may be applied to the gate power line 125. When the ground voltage is applied to the data power line 171c, the driving voltage is applied to the gate power line 125.

The first and second data lines 171a and 171b and the data power line 171c are extended in a horizontal direction crossing the gate line 121 and the storage line 131. The first and second data lines 171a and 171b and the data power line 171c include a first source electrode 173a, a second source electrode 173b and a third source electrode 173c. The first, second and third source electrodes 173a, 173b and 173c have U-shape bent toward the first, second and third gate electrodes 124a, 124b and 124c, respectively. The fourth source electrode 173d that has a U-shape bent toward the fourth gate electrode 124d is extended toward an upper portion of the gate power electrode 127 to be electrically connected to the gate power electrode 127.

An end of a rod shape of each of the first, second, third and fourth drain electrodes 175a, 175b, 175c and 175d faces each of the first, second, third and fourth source electrodes 173a, 173b, 173c and 173d, and is surrounded by each of the first, second, third and fourth source electrodes 173a, 173b, 173c and 173d.

A first contact electrode 177a connected to the first drain electrode 175a is overlapped with a left half of the first storage electrode 133a, and a second contact electrode 177b connected to the second drain electrode 175b is overlapped with a right half of the second storage electrode 133b.

A third contact electrode 177c connected to the third drain electrode 175c is overlapped with a right half of the first storage electrode 133a, and a fourth contact electrode 177d connected to the fourth drain electrode 175d is overlapped with a left half of the second storage electrode 133b.

The first gate electrode 124a, the first source electrode 173a, the first drain electrode 175a and the first semiconductor layer 154a form a first switching element Qa. The second gate electrode 124b, the second source electrode 173b, the second drain electrode 175b and the second semiconductor layer 154b form a second switching element Qb. The third gate electrode 124c, the third source electrode 173c, the third drain electrode 175c and the third semiconductor layer 154c form a third switching element Qc. The fourth gate electrode 124d, the fourth source electrode 173d, the fourth drain electrode 175d and the fourth semiconductor layer 154d form a fourth switching element Qd.

A channel of the first switching element Qa is formed in the first semiconductor layer 154a between the first source electrode 173a and the first drain electrode 175a. A channel of the second switching element Qb is formed in the second semiconductor layer 154b between the second source electrode 173b and the second drain electrode 175b. A channel of the third switching element Qc is formed in the third semiconductor layer 154c between the third source electrode 173c and the third drain electrode 175c. A channel of the fourth switching element Qd is formed in the fourth semiconductor layer 154d between the fourth source electrode 173d and the fourth drain electrode 175d.

A first one 163a of the two first ohmic contact layers 163a and 165a is interposed between the first semiconductor layer 154a and the first source electrode 173a to decrease contact resistance between the first semiconductor layer 154a and the first source electrode 173a, and a second one 165a of the two first ohmic contact layers 163a and 165a is interposed between the first semiconductor layer 154a and the first drain electrode 175a to decrease contact resistance between the first semiconductor layer 154a and the first drain electrode 175a. A first one 163b of the two second ohmic contact layers 163b and 165b is interposed between the second semiconductor layer 154b and the second source electrode 173b to decrease contact resistance between the second semiconductor layer 154b and the second source electrode 173b, and a second one 165b of the two second ohmic contact layers 163b and 165b is interposed between the second semiconductor layer 154b and the second drain electrode 175b to decrease contact resistance between the second semiconductor layer 154b and the second drain electrode 175b. A first one 163c of the two third ohmic contact layers 163c and 165c is interposed between the third semiconductor layer 154c and the third source electrode 173c to decrease contact resistance between the third semiconductor layer 154c and the third source electrode 173c, and a second one 165c of the two third ohmic contact layers 163c and 165c is interposed between the third semiconductor layer 154c and the third drain electrode 175c to decrease contact resistance between the third semiconductor layer 154c and the third drain electrode 175c. A first one 163d of the two fourth ohmic contact layers 163d and 165d is interposed between the fourth semiconductor layer 154d and the fourth source electrode 173d to decrease contact resistance between the fourth semiconductor layer 154d and the fourth source electrode 173d, and a second one 165d of the two fourth ohmic contact layers 163d and 165d is interposed between the fourth semiconductor layer 154d and the fourth drain electrode 175d to decrease contact resistance between the fourth semiconductor layer 154d and the fourth drain electrode 175d.

The first switching element Qa is electrically connected to the first data line 171a. The third switching element Qc is electrically connected to the data power line 171c. The first and third switching elements Qa and Qc are formed in the first pixel PX(n,n).

The second switching element Qb is electrically connected to the second data line 171b. The fourth switching element Qd is electrically connected to the gate power line 125. The second and fourth switching elements Qb and Qd are formed in the second pixel PX(n,n+1).

Voltages having opposite levels are applied to the first and second data lines 171a and 171b, respectively. Voltages having opposite levels are applied to the data power line 171c and the gate power line 125.

A gate contact hole 129 is formed on the gate power electrode 127 through the gate insulating layer 140. The fourth source electrode 173d is connected to the gate power line 125 through the gate contact hole 129.

The data insulating layer 180 is formed on the gate insulating layer 140 to cover the first and second data lines 171a and 171b, the data power line 171c, the first, second, third and fourth source electrodes 173a, 173b, 173c and 173d and the first, second, third and fourth drain electrodes 175a, 175b, 175c and 175d.

A first contact hole 185a is formed on the first contact electrode 177a through the data insulating layer 180. A second contact hole 185b is formed on the second contact electrode 177b through the data insulating layer 180. A third contact hole 185c is formed on the third contact electrode 177c through the data insulating layer 180. A fourth contact hole 185d is formed on the fourth contact electrode 177d through the data insulating layer 180.

A plurality of pixel electrodes 191 is formed on the data metal layer 180. The pixel electrodes 191 includes a first pixel electrode 191a, a second pixel electrode 191b, a first common electrode 191c and a second common electrode 191d. The pixel electrodes 191 may include a transparent conductive material, a reflective material, etc. Examples of the transparent conductive material that may be used for the pixel electrodes 191 may include indium tin oxide (ITO), indium zinc oxide (IZO), carbon nano tube (CNT), etc. Examples of the reflective material that may be used for the pixel electrodes 191 may include aluminum, silver, chromium, an alloy thereof, etc. These may be used alone or in a combination thereof.

The first and second pixel electrodes 191a and 191b and the first and second common electrodes 191c and 191d are formed on the data insulating layer 180. In another embodiment, a transparent metal layer may be patterned to form the first and second pixel electrodes 191a and 191b and the first and second common electrodes 191c and 191d.

The first pixel electrode 191a makes contact with the first contact electrode 177a, and the second pixel electrode 191b makes contact with the second contact electrode 177b. The first common electrode 191c makes contact with the third contact electrode 177c, and the second common electrode 191d makes contact with the second contact electrode 177d.

For example, the pixel electrodes 191 may have a rectangular shape.

The first pixel electrode 191a and the second common electrode 191d are electrically connected to the first and fourth drain electrodes 175a and 175d, respectively. The first pixel electrode 191a and the second common electrode 191d include a first central extension extended in the horizontal direction, and a first branching part extended from the first central extension. An upper portion of the first branching part with respect to the central extension is extended in a first diagonal direction, and a lower portion of the first branching part with respect to the first central extension is extended in a second diagonal direction. The first diagonal direction may form an angle of about 45 degrees or about 225 degrees with respect to the gate line 121. The second diagonal direction may form an angle of 135 degrees or about 315 degrees with respect to the gate line 121.

The second pixel electrode 191b and the first common electrode 191c are electrically connected to the second and third drain electrodes 175b and 175c, respectively. The second pixel electrode 191b and the first common electrode 191c include a second central extension extended in the horizontal direction, and a second branching part extended from the second central extension. An upper portion of the second branching part with respect to the second central extension is extended in the first diagonal direction, and a lower portion of the first branching part with respect to the central extension is extended in the second diagonal direction. The first diagonal direction may form an angle of about 45 degrees or about 225 degrees with respect to the gate line 121. The second diagonal direction may form an angle of 135 degrees or about 315 degrees with respect to the gate line 121.

That is, the first and second branching parts in each of the first and second pixels PX(n,n) and PX(n,n+1) alternate with each other to form a comb shape.

The first pixel electrode 191a is physically and electrically connected to the first drain electrode 175a through the first contact hole 185a to receive a voltage from the first drain electrode 175a. The second pixel electrode 191b is physically and electrically connected to the second drain electrode 175b through the second contact hole 185b to receive a voltage from the second drain electrode 175b. The first common electrode 191c is physically and electrically connected to the third drain electrode 175c through the third contact hole 185c to receive a voltage from the third drain electrode 175c. The second common electrode 191d is physically and electrically connected to the fourth drain electrode 175d through the fourth contact hole 185d to receive a voltage from the fourth drain electrode 175d.

The first and second pixel electrodes 191a and 191b, the first and second common electrodes 191c and 191d and the liquid crystal layer 300 form a liquid crystal capacitor Clc. In the present embodiment, although the first, second, third and fourth switching elements Qa, Qb, Qc and Qd are turned off, a voltage difference between the first and second pixel electrodes 191a and 191b and the first and second common electrodes 191c and 191d is maintained. The first drain electrode 175a electrically connected to the first pixel electrode 191a and the third drain electrode 175c electrically connected to the first common electrode 191c are overlapped with the first storage electrode 133a, and the gate insulating layer 140 is interposed between the first drain electrode 175a and the first storage electrode 133a and between the first common electrode 175c and the first storage electrode 133a, thereby forming the first and third storage capacitors Csta and Cstc. The second drain electrode 175b electrically connected to the second pixel electrode 191b and the fourth drain electrode 175d electrically connected to the second common electrode 191d are overlapped with the second storage electrode 133b, and the gate insulating layer 140 is interposed between the second drain electrode 175b and the second storage electrode 133b and between the second common electrode 175d and the second storage electrode 133b, thereby forming the second and fourth storage capacitors Cstb and Cstd. The first, second, third and fourth storage capacitors Csta, Cstb, Cstc and Cstd maintain the voltage difference applied to the liquid crystal capacitor Clc.

The lower alignment layer 11 is formed on the lower base substrate 110 including the first and second pixel electrodes 191a and 191b and the first and second common electrodes 191c and 191d to align liquid crystal molecules of the liquid crystal layer 300 in a vertical direction. Thus, the liquid crystal molecules of the liquid crystal layer 300 are aligned from the array substrate 100 toward the opposite substrate 200.

The opposite substrate 200 faces the array substrate 100.

The opposite substrate 200 includes an upper base substrate 210, a light blocking pattern 220, a color filter pattern 230, an overcoating layer 250 and an upper alignment layer 21.

The light blocking pattern 220 may prevent leakage of light between adjacent pixel electrodes 191, and defines an opening region facing the pixel electrode 191. The color filter pattern 230 is formed in the opening region defined by the light blocking pattern 220.

The color filter pattern 230 may include a red color filter, a green color filter and a blue color filter. The overcoating layer 230 covers the color filter pattern 230 and the light blocking pattern 220.

The overcoating layer 250 is formed on the light blocking pattern 220 and the color filter pattern 230. The overcoating layer 250 may include an insulating material. For example, the overcoating layer 250 may have a substantially flat surface to cover the color filter 230. Alternatively, the overcoating layer 250 may be omitted.

The upper alignment layer 21 is formed on the overcoating layer 250 to align the liquid crystal molecules of the liquid crystal layer 300 in the vertical direction.

The liquid crystal layer 300 is interposed between the array substrate 100 and the opposite substrate 200. The liquid crystal layer 300 includes the liquid crystal molecules having positive dielectric anisotropy. When the electric field is not applied to the liquid crystal molecules, the liquid crystal molecules are vertically aligned with respect to the surfaces of the array substrate 100 and the opposite substrate 200.

The liquid crystal molecules of the liquid crystal layer 300 vary arrangement in response to the electric field formed between the first and second pixel electrodes 191a and 191b and the first and second common electrodes 191c and 191d, and thus light transmittance of the liquid crystal layer 300 is changed.

For example, when different voltages are applied to the first and second pixel electrodes 191a and 191b and the first and second common electrodes 191c and 191d, an electric field substantially parallel with the surfaces of the array substrate 100 and the opposite substrate 200 may be formed between the first and second pixel electrodes 191a and 191b and the first and second common electrodes 191c and 191d.

Then, the vertically aligned liquid crystal molecules with respect to the array substrate 100 and the opposite substrate 200 change arrangement, so that the liquid crystal molecules are inclined toward the horizontal direction substantially parallel with the direction of the electric field. Thus, polarizing characteristics of the liquid crystal layer 300 are changed, so that the light transmittance of the liquid crystal layer 300 is changed, thereby displaying an image.

When the LCD device uses the vertically aligned liquid crystal molecules, contrast ratio and viewing angle of the LCD device are improved. Also, two different voltages having opposite polarities with respect to the common voltage are applied to the pixel electrode 191, so that driving voltage of the switching elements Qa, Qb, Qc and Qd and the response speed of the liquid crystal molecules are improved. Furthermore, the interference caused by a kickback voltage is prevented, thereby preventing flicker on the LCD device.

Figure 4:
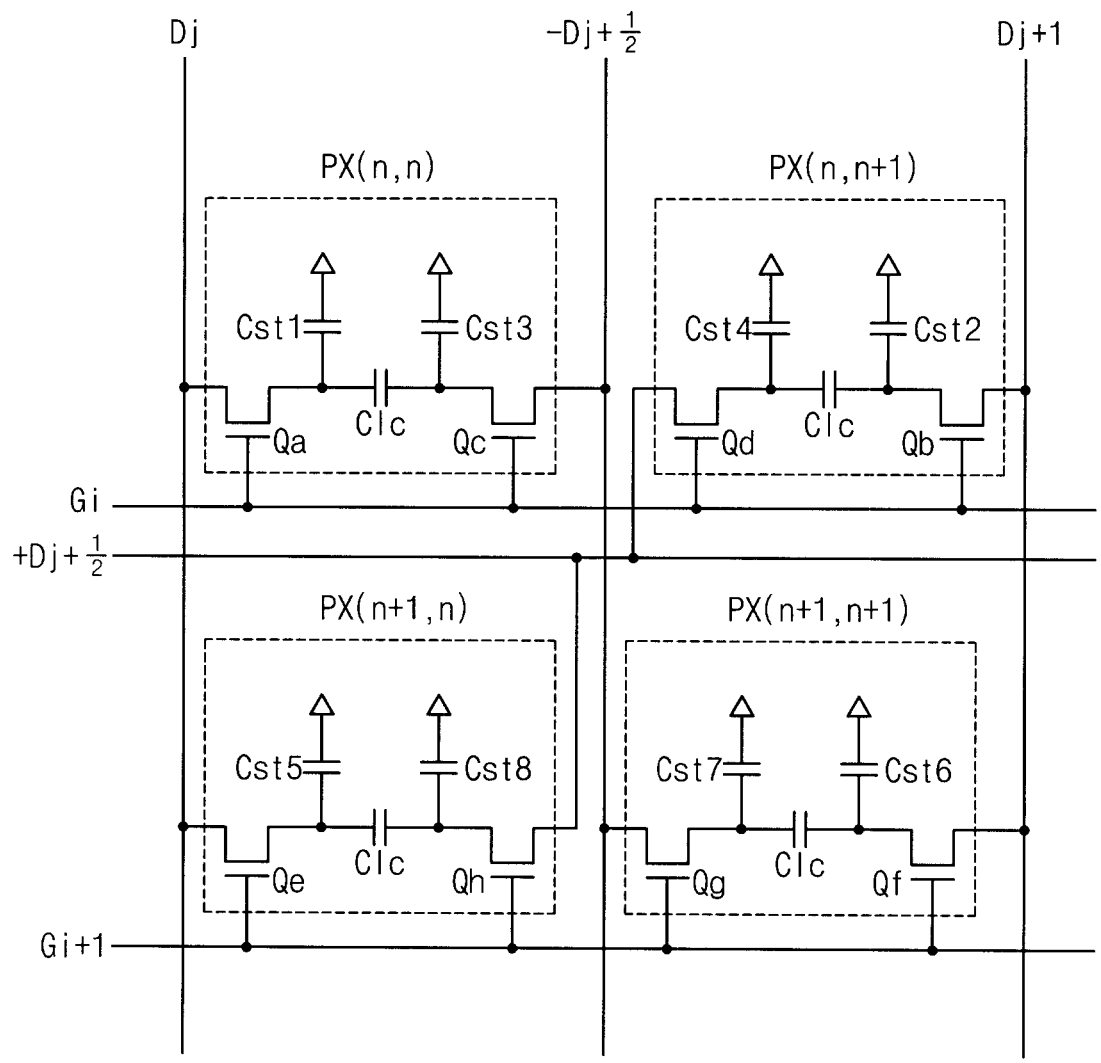
FIG. 4 is an equivalent circuit diagram illustrating the LCD device shown in FIG. 1.

FIG. 4 is an equivalent circuit diagram illustrating the LCD device shown in FIG. 1.

Referring to FIGS. 1 to 4, the LCD device includes a plurality of signal lines Dj, Dj+1, −Dj+1/2, +Dj+1, Gi and Gi+1. The LCD device may further include a plurality of pixels electrically connected to the signal lines Dj, Dj+1, −Dj+1/2, Gi and Gi+1. The pixels are arranged in a matrix shape.

In FIG. 2, the LCD device includes the array substrate 100, the opposite substrate 200 facing the array substrate 100, and the liquid crystal layer 300 interposed between the array substrate 100 and the opposite substrate 200.

The signal lines Dj, Dj+1, −Dj+1/2, Gi and Gi+1 includes a first gate line Gi, a second gate line Gi+1, a first data line Dj, a second data line Dj+1, a third data line −Dj+1/2 and a fourth data line +Dj+1/2. The first and second gate lines Gi and Gi+1 transmit a gate signal (a scan signal). The first and second data lines Dj and Dj+1 transmit a data voltage. The driving voltage and the ground voltage are applied to the third and fourth data lines −Dj+1/2 and +Dj+1/2 by the frame.

The first gate line Gi, the second gate line Gi+1 and the fourth data line +Dj+1/2 are extended in a column direction, and are substantially parallel with each other. The first data line Dj, the second data line Dj+1 and the third data line −Dj+1/2 are extended in a row direction, and are substantially parallel with each other.

The voltages having the opposite polarities are applied to the first and second data lines Dj and Dj+1, respectively. The voltages having the opposite polarities are applied to the third data line −Dj+1/2 and the fourth data line +Dj+1/2.

The driving voltage and the ground voltage are alternately applied to the third and fourth data lines −Dj+1/2 and +Dj+1/2 in every frame. For example, an area corresponding to the first and second data lines Dj and Dj+1 is smaller than an area corresponding to the third and fourth data lines −Dj+1/2 and +Dj+1/2.

For example, the first and second data lines Dj and Dj+1 of FIG. 4 correspond to the first and second data lines 171a and 171b of FIG. 1 formed in the first and second pixels PX(n,n) and PX(n,n+1).

The first gate line Gi of FIG. 4 corresponds to the gate line 121 of FIG. 1.

The third and fourth data lines −Dj+1/2 and +Dj+1/2 of FIG. 4 correspond to the data power line 171c and the gate power line 125 of FIG. 1.

The first, second, third and fourth switching elements Qa, Qb, Qc and Qd are electrically connected to the first and second data lines 171a and 171b, the data power line 171c and the gate power line 125.

Referring again to FIG. 4, the first, second, third and fourth data lines Dj, Dj+1, −Dj+1/2 and +Dj+1/2 are electrically connected to the first, second, third and fourth switching elements Qa, Qb, Qc and Qd.

Alternatively, the first and second data lines Dj and Dj+1 may be electrically connected to a fifth switching element Qe and a sixth switching element Qf, respectively. Also, the third and fourth data lines −Dj+1/2 and +Dj+1/2 may be electrically connected to a seventh switching element Qg and a eighth switching element Qh. The fifth, sixth, seventh and eighth switching elements Qe, Qf, Qg and Qh may be electrically connected to the second gate line Gi+1.

A third pixel PX(n+1,n) and a fourth pixel PX(n+1,n+1) may be disposed on a next line to the first and second pixels PX(n,n) and PX(n,n+1). The fifth and eighth switching elements Qe and Qh may be formed in the third pixel PX(n+1,n). The sixth and seventh switching elements Qf and Qg may be formed in the fourth pixel PX(n+1,n+1).

Referring again to FIGS. 1 and 4, the branching part of the first pixel electrode 1191a and the branching part of the first common electrode 191c are alternately arranged. The branching part of the second pixel electrode 191b and the branching part of the second common electrode 191d are alternately arranged.

For example, a branching part of the third pixel electrode electrically connected to the fifth switching element Qe and a branching part of the fourth common electrode electrically connected to the eighth switching element Qh are alternately arranged. Also, a branching part of the fourth pixel electrode electrically connected to the sixth switching element Qf and a branching part of the third common electrode electrically connected to the seventh switching element Qg are alternately arranged.

Voltages having opposite polarities are applied to the first data line Dj and the second data line Dj+1. Voltages having opposite polarities are applied to the third data line −Dj+1/2 and the fourth data line +Dj+1/2. Thus, adjacent pixels of the first, second, third and fourth pixels PX(n,n), PX(n,n+1), PX(n+1,n) and PX(n+1,n+1) receive different voltages having the opposite polarities.

Referring again to FIGS. 1 to 4, the storage line 131 is overlapped with the pixel electrodes electrically connected to the first, second, third, fourth, fifth, sixth, seventh and eighth switching elements Qa, Qb, Qc, Qd, Qe, Qf, Qg and Qh to form first, second, third, fourth, fifth, sixth, seventh and eighth storage capacitors Cst1, Cst2, Cst3, Cst4, Cst5, Cst6, Cst7 and Cst8, respectively. For example, the ground voltage may be applied to the storage line 131.

The liquid crystal layer 300 in the first, second, third and fourth pixels PX(n,n), PX(n,n+1), PX(n+1,n) and PX(n+1,n+1) functions as a dielectric material of the liquid crystal capacitor Clc. The liquid crystal capacitor Clc is formed by the pixel electrodes and the liquid crystal layer 300.

The liquid crystal layer 300 has dielectric anisotropy. When the electric field is not applied to the liquid crystal layer 300, the liquid crystal molecules of the liquid crystal layer 300 are vertically aligned between the array substrate 100 and the opposite substrate 200.

Hereinafter, a method of manufacturing the array substrate will be explained with reference to FIGS. 1 to 4.

The gate line 121, the gate power line 125 and the storage line 131 are substantially parallel with each other.

The first and third gate electrodes 124a and 124c correspond to the first pixel PX(n,n). The second and fourth gate electrodes 124b and 124d correspond to the second pixel PX(n,n+1). The first storage electrode 133a corresponds to the first pixel PX(n,n). The second storage electrode 133b corresponds to the second pixel PX(n,n+1). The gate power electrode 127 corresponds to the second pixel PX(n,n+1).

The gate insulating layer 140 is formed on the lower base substrate 110 having the first, second, third and fourth gate electrodes 124a, 124b, 124c and 124d, the first and second storage electrodes 133a and 133b and the gate power electrode 127. The data metal layer including the first data line 171a, the second data line 171b, the data power line 171c, the first drain electrode 175a, the second drain electrode 175b, the third drain electrode 175c, the fourth drain electrode 175d, the first source electrode 173a, the second source electrode 173b, the third source electrode 173c and the fourth source electrode 173d is formed.

The first data line 171a, the second data line 171b and the data power line 171c are substantially parallel with each other.

The first switching element Qa electrically connected to the first data line 171a and the gate line 121, the second switching element Qb electrically connected to the second data line 171b and the gate line 121, the third switching element Qc electrically connected to the data power line 171c and the gate line 121 and the fourth switching element Qd electrically connected to the gate power line 125 and the gate line 121 are formed on the gate insulating layer 140. The gate power line 125 receives a voltage having different polarity from the data power line 171c.

The fifth and eighth switching elements Qe and Qh are formed in the third pixel PX(n+1,n). The sixth and seventh switching elements Qf and Qg are formed in the fourth pixel PX(n+1,n+1).

The data metal layer 180 is then formed.

The first pixel electrode 171a electrically connected to the first switching element Qa, the second pixel electrode 191b electrically connected to the second switching element Qb, the first common electrode 191c electrically connected to the third switching element Qc and the second common electrode 191d electrically connected to the fourth switching element Qd are formed on the gate insulating layer 140 having the data metal layer 180.

The first pixel electrode 191a and the first common electrode 191c are formed in the first pixel PX(n,n). The second pixel electrode 191b and the second common electrode 191d are formed in the second pixel PX(n,n+1). The second pixel PX(n,n+1) is adjacent to the first pixel PX(n,n) along the first data line 171a.

The third pixel electrode electrically connected to the fifth switching element Qe, the fourth pixel electrode electrically connected to the switching element Qf, the third common electrode electrically connected to the seventh switching element Qg and the fourth common electrode electrically connected to the eighth switching element Qh are then formed.

The lower alignment layer 11 is formed on the lower base substrate 110 having the first, second, third and fourth pixel electrodes 191a and 191b, the first, second, third and fourth common electrodes 191c and 191d.

Different voltages having opposite polarities are alternately applied to the first, second, third and fourth pixels PX(n,n), PX(n,n+1), PX(n+1,1) and PX(n+1,n+1), so that a dot inversion is performed in the LCD device in every frame.

Alternatively, when a voltage having substantially the same polarity is applied to the third and fourth data lines −Dj+1/2 and +Dj+1/2, the first and third pixels PX(n,n) and PX(n+1,n) that are adjacent to each other in the horizontal direction may receive the voltage having the same level and the second and fourth pixels PX(n,n+1) and PX(n+1,n+1) that are adjacent to each other in the horizontal direction may receive the voltage having the same level that is different from the level of the voltage applied to the first and third pixels PX(n,n) and PX(n+1,n). Thus, the first and third pixels PX(n,n) and PX(n+1,n) receive different voltage from the second and fourth pixels PX(n,N+1) and PX(n+1,n+1), so that a line inversion may be performed in every frame.

The levels of the voltages applied to the data lines of the signal lines Dj, Dj+1, −Dj+1/2, +Dj+1/2, Gi and Gi+1 are changed so that the dot inversion or the line inversion may be performed.

According to the present embodiment, the data power line 171c and the gate power line 125 receive the voltages having the opposite polarities, so that the voltages having the different polarities may be applied to each of the pixels and opening ratio of the pixels is increased.

Figure 5:
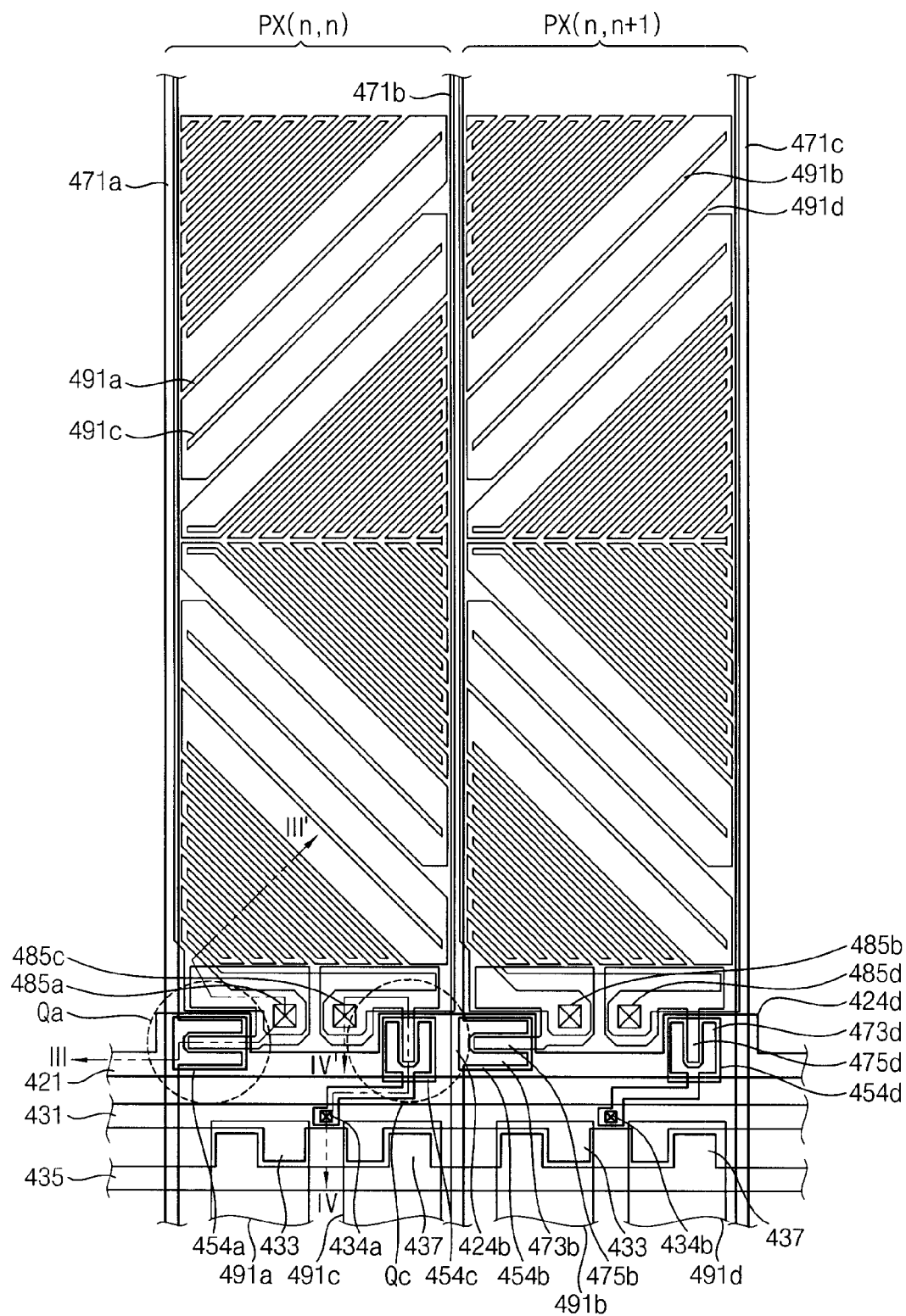
FIG. 5 is a plan view illustrating an LCD device in accordance with another embodiment of the present invention.
Figure 6:
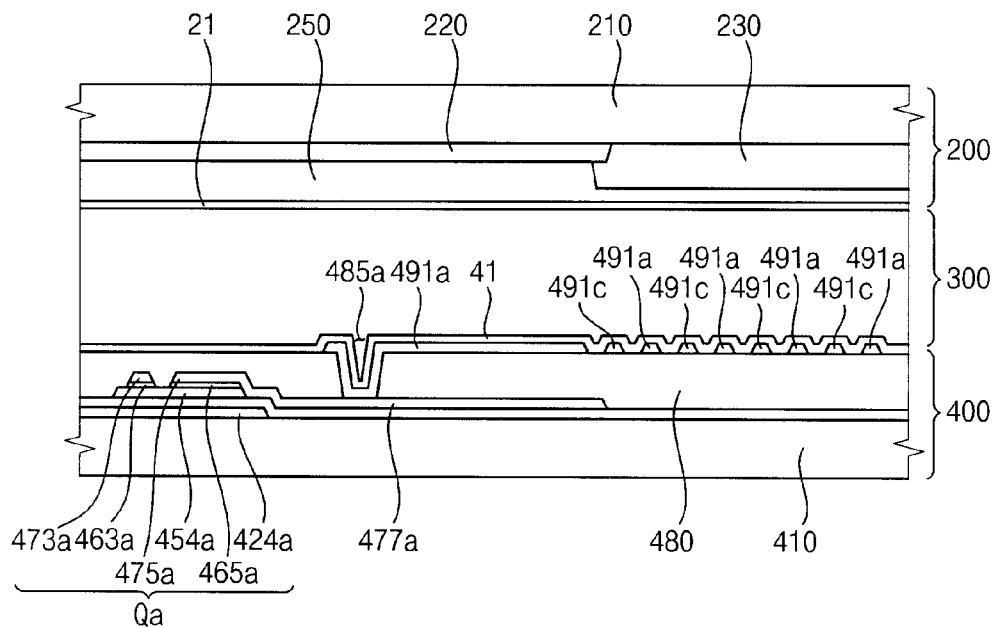
FIG. 6 is a cross-sectional view taken along a line III-III' shown in FIG. 5.
Figure 7:
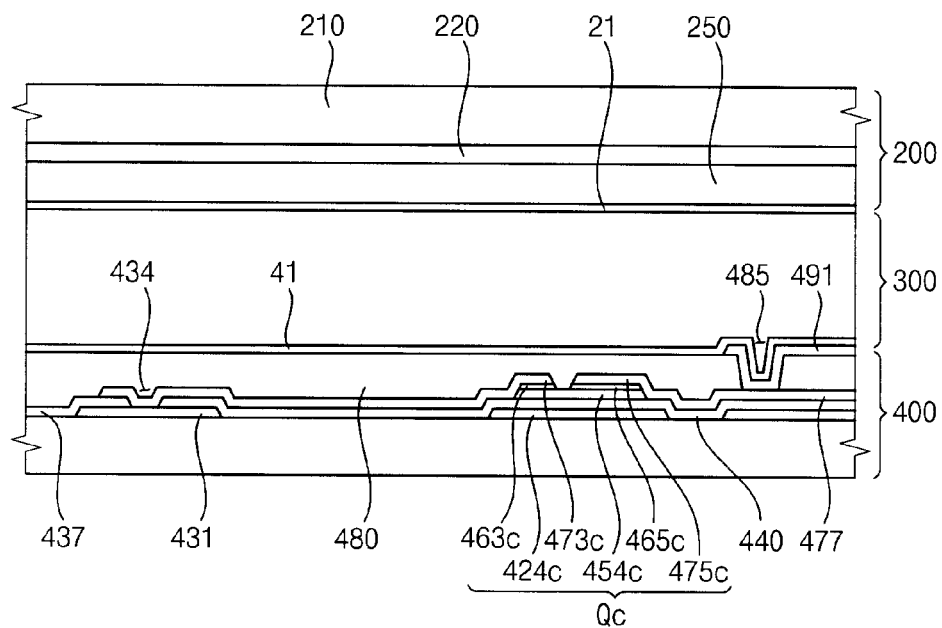
FIG. 7 is a cross-sectional view taken along a line IV-IV' shown in FIG. 5.

FIG. 5 is a plan view illustrating an LCD device in accordance with another embodiment of the present invention. FIG. 6 is a cross-sectional view taken along a line III-III' shown in FIG. 5. FIG. 7 is a cross-sectional view taken along a line IV-IV' shown in FIG. 5. The LCD device of FIGS. 5 to 7 is same as in FIGS. 1 to 4 except an array substrate 400. Thus, the same reference numerals will be used to refer to the same or like parts as those described in FIGS. 1 to 4 and any further explanation concerning the above elements will be omitted.

Referring to FIGS. 5 to 7, the LCD device includes an array substrate 400, an opposite substrate 200 and a liquid crystal layer 300.

In FIG. 5, a first pixel PX(n,n) and a second pixel PX(n,n+1) of the LCD device are illustrated.

The array substrate 400 includes a lower base substrate 410. A pixel region is defined in the lower base substrate 410.

The lower base substrate 410 has a plate shape. A transparent material that may be used for the lower base substrate 410 may include glass, quartz, synthetic resin, etc. These may be used alone or in a combination thereof.

A gate metal layer is formed on the lower base substrate 410. The gate metal layer may include a gate line 421, a first power line 431 and a second power line 435.

The gate line 421 is extended in a longitudinal direction to transmit a gate signal. Each of the gate lines 421 includes a first gate electrode 424a, a second gate electrode 424b, a third gate electrode 424c and a fourth gate electrode 424d that are upwardly protruded. The first and third gate electrodes 424a and 424c correspond to the first pixel PX(n,n). The second and fourth gate electrodes 424b and 424d correspond to the second pixel PX(n,n+1).

The first power line 431 receives a ground voltage, and is extended in the longitudinal direction. Each of the first power line 431 is interposed between two adjacent gate lines 421, and is adjacent to a lower one of the two adjacent gate lines 421. Each of the first power line 431 includes a first power electrode 433. The first power electrode 433 corresponds to the first pixel PX(n,n).

The second power line 435 receives a predetermined voltage, and is extended in the longitudinal direction. Each of the second power line 435 is interposed between the first power line 435 and the lower one of the two adjacent gate lines 421. Each of the second power line 435 includes a second power electrode 437. The second power electrode 437 corresponds to the second pixel PX(n,n+1).

The gate insulating layer 440 is formed on the lower base substrate 410 to cover the gate line 421, the first, second, third and fourth gate electrodes 424a, 424b, 424c and 424d, and the first and second power electrodes 433 and 437.

A first gate contact hole 434a is formed on the first power electrode 433 through the gate insulating layer 440. A second gate contact hole 434b is formed on the second power electrode 437 through the gate insulating layer 440.

A first semiconductor layer 454a, a second semiconductor layer 454b, a third semiconductor layer 454c and a fourth semiconductor layer 454d are formed on the gate insulating layer 440. The first, second, third and fourth semiconductor layers 454a, 454b, 454c and 454d are formed on the first, second, third and fourth gate electrodes 424a, 424b, 424c and 424d, respectively.

Two first ohmic contact layers 463a and 465a are formed on the first semiconductor layers 454a. Two second ohmic contact layers 463b and 465b are formed on the second semiconductor layers 454b. Two third ohmic contact layers 463c and 465c are formed on the third semiconductor layers 454c. Two fourth ohmic contact layers 463d and 465d are formed on the fourth semiconductor layers 454d. The first, second, third and fourth ohmic contact layers 463a, 463b, 463c, 463d, 465a, 465b, 465c and 465d may include n+ hydrogenated amorphous silicon that is implanted by n type impurities at a high concentration, silicide, etc.

A data metal layer including a first data line 471a, a second data line 471b, a third data line 471c, a first drain electrode 475a, a second drain electrode 475b, a third drain electrode 475c and a fourth drain electrode 475d is formed on the first, second, third and fourth ohmic contact layers 463a, 463b, 463c, 463d, 465a, 465b, 465c and 465d and the gate insulating layer 440.

The first, second and third data lines 471a, 471b and 471c transmit data signals. The first, second and third data lines 471a, 471b and 471c are extended in a horizontal direction crossing the gate line 421 and the first and second power lines 431 and 435.

The first data line 471a includes a first source electrode 473a having U-shape bent toward the first gate electrode 424a. The second data line 471b includes a second source electrode 473b having U-shape bent toward the second gate electrode 424b. The first power line 431 includes a third source electrode 473c having U-shape bent toward the third gate electrode 424c. The second power line 435 includes a fourth source electrode 473d having U-shape bent toward the fourth gate electrode 424d.

An end of a rod shape of each of the first, second, third and fourth drain electrodes 475a, 475b, 475c and 475d faces each of the first, second, third and fourth source electrodes 473a, 473b, 473c and 473d, and is surrounded by each of the first, second, third and fourth source electrodes 473a, 473b, 473c and 473d, respectively.

The first source electrode 473a is directly connected to the first data line 471a. The second source electrode 473b is directly connected to the second data line 471b. The third source electrode 473c is connected to the first power line 431 through the first gate contact hole 434a. The fourth source electrode 473d is connected to the second power line through the second gate contact hole 434b.

The first gate electrode 424a, the first source electrode 473a, the first drain electrode 475a and the first semiconductor layer 454a form a first switching element Qa. The second gate electrode 424b, the second source electrode 473b, the second drain electrode 475b and the second semiconductor layer 454b form a second switching element Qb. The third gate electrode 424c, the third source electrode 473c, the third drain electrode 475c and the third semiconductor layer 454c form a third switching element Qc. The fourth gate electrode 424d, the fourth source electrode 473d, the fourth drain electrode 475d and the fourth semiconductor layer 454d form a fourth switching element Qd.

A channel of the first switching element Qa is formed in the first semiconductor layer 454a between the first source electrode 473a and the first drain electrode 475a. A channel of the second switching element Qb is formed in the second semiconductor layer 154b between the second source electrode 473b and the second drain electrode 475b. A channel of the third switching element Qc is formed in the third semiconductor layer 454c between the third source electrode 473c and the third drain electrode 475c. A channel of the fourth switching element Qd is formed in the fourth semiconductor layer 454d between the fourth source electrode 473d and the fourth drain electrode 475d.

A first one 463a of the two first ohmic contact layers 463a and 465a is interposed between the first semiconductor layer 454a and the first source electrode 473a to decrease contact resistance between the first semiconductor layer 454a and the first source electrode 473a, and a second one 465a of the two first ohmic contact layers 463a and 465a is interposed between the first semiconductor layer 454a and the first drain electrode 475a to decrease contact resistance between the first semiconductor layer 454a and the first drain electrode 475a. A first one 463b of the two second ohmic contact layers 463b and 465b is interposed between the second semiconductor layer 454b and the second source electrode 473b to decrease contact resistance between the second semiconductor layer 454b and the second source electrode 473b, and a second one 465b of the two second ohmic contact layers 463b and 465b is interposed between the second semiconductor layer 454b and the second drain electrode 475b to decrease contact resistance between the second semiconductor layer 454b and the second drain electrode 475b. A first one 463c of the two third ohmic contact layers 463c and 465c is interposed between the third semiconductor layer 454c and the third source electrode 473c to decrease contact resistance between the third semiconductor layer 454c and the third source electrode 473c, and a second one 465c of the two third ohmic contact layers 463c and 465c is interposed between the third semiconductor layer 454c and the third drain electrode 475c to decrease contact resistance between the third semiconductor layer 454c and the third drain electrode 475c. A first one 463d of the two fourth ohmic contact layers 463d and 465d is interposed between the fourth semiconductor layer 454d and the fourth source electrode 473d to decrease contact resistance between the fourth semiconductor layer 454d and the fourth source electrode 473d, and a second one 465d of the two fourth ohmic contact layers 463d and 465d is interposed between the fourth semiconductor layer 454d and the fourth drain electrode 475d to decrease contact resistance between the fourth semiconductor layer 454d and the fourth drain electrode 475d.

The first switching element Qa is electrically connected to the first data line 471a. The third switching element Qc is electrically connected to the first power line 431. The first and third switching elements Qa and Qc are formed in the first pixel PX(n,n).

The second switching element Qb is electrically connected to the second data line 471b. The fourth switching element Qd is electrically connected to the second power line 435. The second and fourth switching elements Qb and Qd are formed in the second pixel PX(n,n+1).

Voltages having opposite levels are applied to the first and second data lines 471a and 471b, respectively.

The data insulating layer 480 is formed on the gate insulating layer 440 to cover the first and second data lines 471a and 471b, the first, second, third and fourth source electrodes 473a, 473b, 473c and 473d, and the first, second, third and fourth drain electrodes 475a, 475b, 475c and 475d.

A first contact hole 485a is formed on the first contact electrode 477a connected to the first drain electrode 475a through the data insulating layer 480. A second contact hole 485b is formed on the second contact electrode 477b connected to the second drain electrode 475b through the data insulating layer 480. A third contact hole 485c is formed on the third contact electrode 477c connected to the third drain electrode 475c through the data insulating layer 480. A fourth contact hole 485d is formed on the fourth contact electrode 477d connected to the fourth drain electrode 475d through the data insulating layer 480.

A plurality of pixel electrodes 491 is formed on the data metal layer 480. The pixel electrodes 491 includes a first pixel electrode 491a, a second pixel electrode 491b, a first common electrode 491c and a second common electrode 491d. The pixel electrodes 491 may include a transparent conductive material, a reflective material, etc. Examples of the transparent conductive material that may be used for the pixel electrodes 491 may include indium tin oxide (ITO), indium zinc oxide (IZO), carbon nano tube (CNT), etc. Examples of the reflective material that may be used for the pixel electrodes 491 may include aluminum, silver, chromium, an alloy thereof, etc. These may be used alone or in a combination thereof.

The first and second pixel electrodes 491a and 491b and the first and second common electrodes 491c and 491d are formed on the data insulating layer 480. In another embodiment, a transparent metal layer may be patterned to form the first and second pixel electrodes 491a and 491b and the first and second common electrodes 491c and 491d.

The first pixel electrode 491a makes contact with the first contact electrode 477a, and the second pixel electrode 491b makes contact with the second contact electrode 477b. The first common electrode 491c makes contact with the third contact electrode 477c, and the second common electrode 491d makes contact with the second contact electrode 477d.

For example, the pixel electrodes 491 may have a rectangular shape.

The first and second pixel electrodes 491a and 491b include a first central extension, a first main branching part and a first branching part. The first central extension is electrically connected to the first and second drain electrodes 475a and 475b to be extended in the horizontal direction. The first main branching part crosses a center of the first central extension in the longitudinal direction. An upper portion of the first branching part with respect to the central extension is extended in a first diagonal direction, and a lower portion of the first branching part with respect to the first central extension is extended in a second diagonal direction. The first diagonal direction may form an angle of about 45 degrees or about 225 degrees with respect to the gate line 421. The second diagonal direction may form an angle of 135 degrees or about 315 degrees with respect to the gate line 421.

A distance between the center of the first central extension and the first branching parts is greater than a distance between an end of the first central extension and the first branching parts.

The first and second common electrodes 491c and 491d include a second central extension, a second main branching part and a second branching part. The second central extension is electrically connected to the third and fourth drain electrodes 475c and 475d to be extended in the horizontal direction. The second main branching part crosses a center of the second central extension in the longitudinal direction. An upper portion of the second branching part with respect to the central extension is extended in the first diagonal direction, and a lower portion of the second branching part with respect to the second central extension is extended in the second diagonal direction. The second diagonal direction may form an angle of about 45 degrees or about 225 degrees with respect to the gate line 421. The second diagonal direction may form an angle of 135 degrees or about 315 degrees with respect to the gate line 421.

A distance between the center of the second central extension and the second branching parts is greater than a distance between an end of the second central extension and the second branching parts.

That is, the first and second branching parts in each of the first and second pixels PX(n,n) and PX(n,n+1) alternate with each other to form a comb shape.

The first pixel electrode 491a is physically and electrically connected to the first drain electrode 475a through the first contact hole 485a to receive a voltage from the first drain electrode 475a. The second pixel electrode 491b is physically and electrically connected to the second drain electrode 475b through the second contact hole 485b to receive a voltage from the second drain electrode 475b. The first common electrode 491c is physically and electrically connected to the third drain electrode 475c through the third contact hole 485c to receive a voltage from the third drain electrode 475c. The second common electrode 491d is physically and electrically connected to the fourth drain electrode 475d through the fourth contact hole 485d to receive a voltage from the fourth drain electrode 475d. The first and second pixel electrodes 491a and 491b, the first and second common electrodes 491c and 491d and the liquid crystal layer 300 form a liquid crystal capacitor Clc. In the present embodiment, although the first, second, third and fourth switching elements Qa, Qb, Qc and Qd are turned off, a voltage difference between the first and second pixel electrodes 491a and 491b and the first and second common electrodes 491c and 491d is maintained.

The first pixel electrode 491a and the first common electrode 491c are partially overlapped with the first power electrodes 433, and the data insulating layer 480 is interposed between the first pixel electrode 491a and the first power lines 433 and between the first common electrode 491c and the first power lines 433, thereby forming first storage capacitors Csg. The second pixel electrode 491b and the second common electrode 491d are partially overlapped with the second power electrodes 437, and the data insulating layer 480 is interposed between the second pixel electrode 491b and the second power lines 437 and between the second common electrode 491d and the second power lines 437, thereby forming second storage capacitors Csa, thereby forming the second storage capacitors Csa. The first and second storage capacitors Csg and Csa maintain the voltage difference applied to the liquid crystal capacitor Clc.

For example, the first storage capacitors Csg formed by overlapping the first pixel electrode 491a and the first power electrodes 433 and overlapping the first common electrode 491c and the first power electrodes 433 have substantially the same capacity as the second storage capacitors Csa formed by overlapping the second electrode 491a and the second power electrodes 437 and overlapping the second common electrode 491d and the second power electrodes 437.

The lower alignment layer 41 is formed on the lower base substrate 410 including the first and second pixel electrodes 491a and 491b and the first and second common electrodes 491c and 491d to align liquid crystal molecules of the liquid crystal layer 300 in a vertical direction. Thus, the liquid crystal molecules of the liquid crystal layer 300 are aligned from the array substrate 100 toward the opposite substrate 200.

Figure 8:
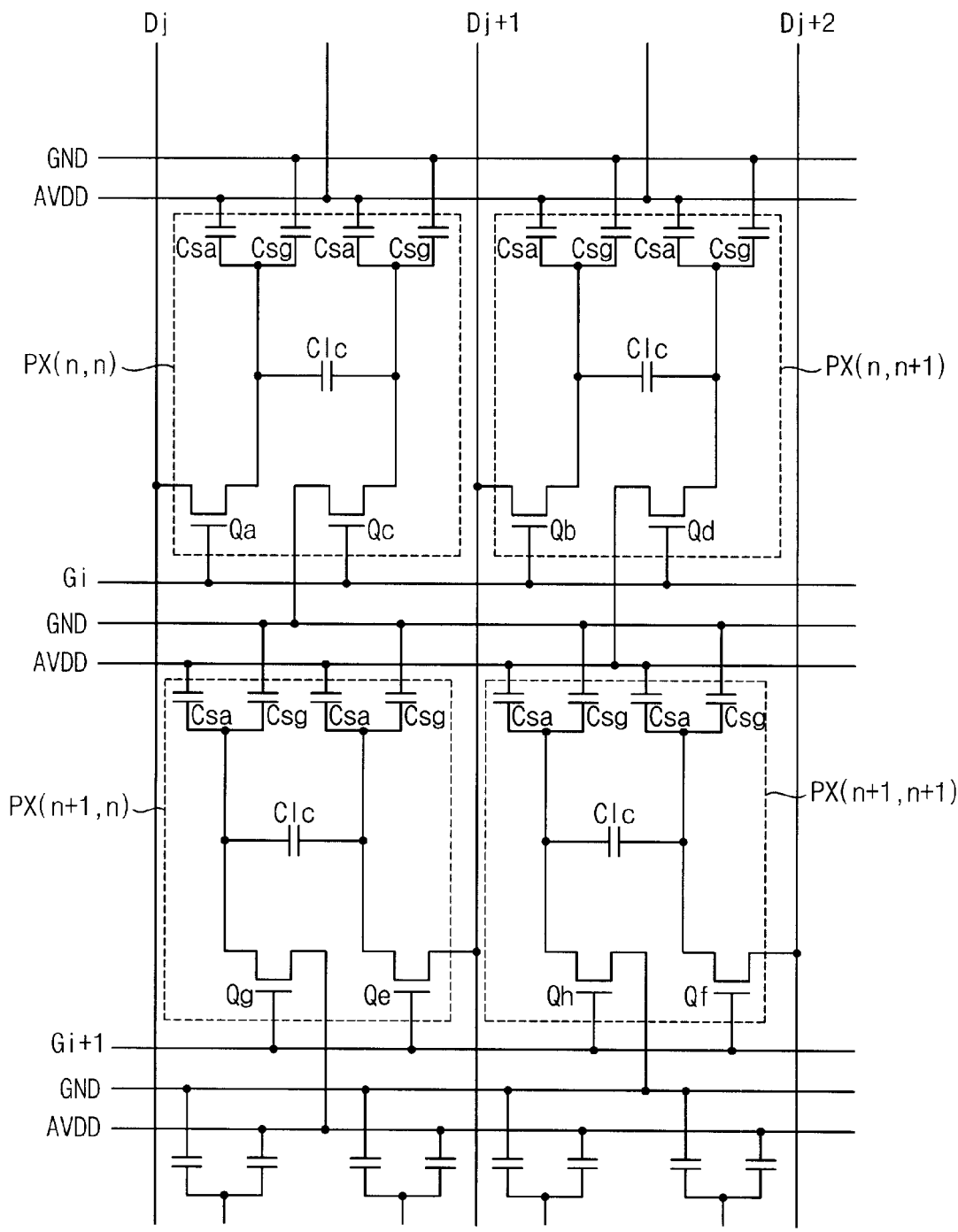
FIG. 8 is an equivalent circuit diagram illustrating the LCD device shown in FIG. 5.

FIG. 8 is an equivalent circuit diagram illustrating the LCD device shown in FIG. 5.

Referring to FIGS. 5 to 8, the LCD device includes a plurality of signal lines Dj, Dj+1, Dj+2, Gi and Gi+1, a ground line GND and a power supply line ADD. The LCD device may further include a plurality of pixels electrically connected to the signal lines Dj, Dj+1, Dj+2, Gi and Gi+1, the ground line GND and the power supply line ADD. The pixels are arranged in a matrix shape.

In FIG. 6, the LCD device includes the array substrate 400, the opposite substrate 200 facing the array substrate 100, and the liquid crystal layer 300 interposed between the array substrate 400 and the opposite substrate 200.

The signal lines Dj, Dj+1, Dj+2, Gi and Gi+1 includes a first gate line Gi, a second gate line Gi+1, a first data line Dj, a second data line Dj+1 and a third data line Dj+2. The first and second gate lines Gi and Gi+1 transmit a gate signal (a scan signal). The first, second and third data lines Dj, Dj+1 and Dj+2 transmit a data voltage.

The first gate line Gi, the second gate line Gi+1, the ground line GND and the power supply line ADD are extended in a column direction, and are substantially parallel with each other. The first data line Dj, the second data line Dj+1 and the third data line Dj+2 are extended in a row direction, and are substantially parallel with each other.

The voltages having the opposite polarities are applied to the first and second data lines Dj and Dj+1, respectively. The voltage applied to the third data line Dj+2 has substantially the same polarity as the first data line Dj.

For example, the first, second and third data lines Dj, Dj+1 and Dj+2 of FIG. 8 correspond to the first, second and third data lines 471a, 471b and 471c of FIG. 5 formed in the first and second pixels PX(n,n) and PX(n,n+1).

The first gate line Gi of FIG. 8 corresponds to the gate line 421 of FIG. 5.

The ground line GND and the power supply line ADD of FIG. 8 correspond to the first power line 431 and the second power line 435 of FIG. 5, respectively.

The first and second switching transistors Qa and Qb are electrically connected to the first and second data lines 471a and 471b, respectively. The third and fourth switching transistors Qc and Qd are electrically connected to the first and second power lines 431 and 435, respectively.

Referring again to FIG. 8, the first and second data lines Dj and Dj+1 are electrically connected to the first and second switching elements Qa and Qb, respectively. The ground line GND and the power supply line ADD are electrically connected to the first and second switching elements Qc and Qd, respectively.

Alternatively, the second and third data lines Dj+1 and Dj+2 may be electrically connected to a fifth switching element Qe and a sixth switching element Qf, respectively. Also, the power supply line ADD and the ground line GND may be electrically connected to a seventh switching element Qg and an eighth switching element Qh.

A third pixel PX(n+1,n) and a fourth pixel PX(n+1,n+1) may be disposed on a next line to the first and second pixels PX(n,n) and PX(n,n+1).

The fifth and seventh switching elements Qe and Qg may be formed in the third pixel PX(n+1,n). The sixth and eighth switching elements Qf and Qh may be formed in the fourth pixel PX(n+1,n+1).

The fifth, sixth, seventh and eighth switching elements Qe, Qf, Qg and Qh are operated using the second gate line Gi+1.

The voltages having the opposite polarities are applied to the first data line Dj and the second data line Dj+1. The ground voltage is applied to the ground line GND, and a predetermined power voltage is applied to the power supply line ADD.

Thus, adjacent pixels of the first, second, third and fourth pixels PX(n,n), PX(n,n+1), PX(n+1,n) and PX(n+1,n+1) receive different voltages having the opposite polarities.

Referring again to FIGS. 5 and 8, the ground line GND and the power supply line ADD are overlapped with the pixel electrodes electrically connected to the first, second, third, fourth, fifth, sixth, seventh and eighth switching elements Qa, Qb, Qc, Qd, Qe, Qf, Qg and Qh to form first and second storage capacitors Csg and Csa.

The liquid crystal layer 300 in the first, second, third and fourth pixels PX(n,n), PX(n,n+1), PX(n+1,n) and PX(n+1,n+1) functions as a dielectric material of the liquid crystal capacitor Clc. The liquid crystal capacitor Clc is formed by the pixel electrodes and the liquid crystal layer 300.

The liquid crystal layer 300 has dielectric anisotropy. When the electric field is not applied to the liquid crystal layer 300, the liquid crystal molecules of the liquid crystal layer 300 are vertically aligned between the array substrate 400 and the opposite substrate 200.

Hereinafter, a method of manufacturing the array substrate will be explained with reference to FIGS. 5 to 8.

The gate line 421, the first power line 431 and the second power line 435 are substantially parallel with each other.

The first and third gate electrodes 424a and 424c correspond to the first pixel PX(n,n). The second and fourth gate electrodes 424b and 424d correspond to the second pixel PX(n,n+1). The first storage electrode 433 corresponds to the first pixel PX(n,n). The second storage electrode 437 corresponds to the second pixel PX(n,n+1).

The gate insulating layer 140 is then formed on the lower base substrate 410.

A data metal layer including the first, second and third data lines 471a, 471b and 471c, the first, second, third and fourth drain electrodes 475a, 475b, 475c and 475d and the first, second, third and fourth source electrodes 473a, 473b, 473c and 473d is formed.

The first data line 471a, the second data line 471b and the third data line 471c are substantially parallel with each other.

The data insulating layer 480 is then formed.

The first and second pixel electrodes 491a and 491b and the first and second common electrodes 491c and 491d are then formed on the lower base substrate 410 having the data insulating layer 480. The first pixel electrode 491a and the first common electrode 491c are partially overlapped with the first power electrode 433, and the date insulating layer 480 is interposed between the first pixel electrode 491a and the first power electrode 433 and between the first common electrode 491c and the first power electrode 433, thereby forming the first storage capacitors Csg. The second pixel electrode 491b and the second common electrode 491d are partially overlapped with the second power electrode 437, and the date insulating layer 480 is interposed between the second pixel electrode 491b and the second power electrode 437 and between the second common electrode 491d and the second power electrode 437, thereby forming the second storage capacitors Csa.

The lower alignment layer 11 is then formed.

Different voltages having opposite polarities are alternately applied to the first, second, third and fourth pixels PX(n,n), PX(n,n+1), PX(n+1,1) and PX(n+1,n+1), so that a dot inversion is performed in the LCD device in every frame.

Alternatively, when the ground line GND or the power supply line ADD is electrically connected in line-by-line connection, a voltage having substantially the same polarity is applied to the pixels aligned along the first gate line Gi, so that a line inversion may be performed in every frame. For example, the line inversion may be a horizontal line inversion.

The levels of the voltages applied to the data lines of the signal lines Dj, Dj+1, Dj/2, Gi and Gi+1 are changed so that the dot inversion or the line inversion may be performed.

According to the present embodiment, the first power line 431 and the second power line 435 are overlapped with the pixel electrodes to form the storage capacitors, so that opening ratio of the pixels is increased.

Figure 9:
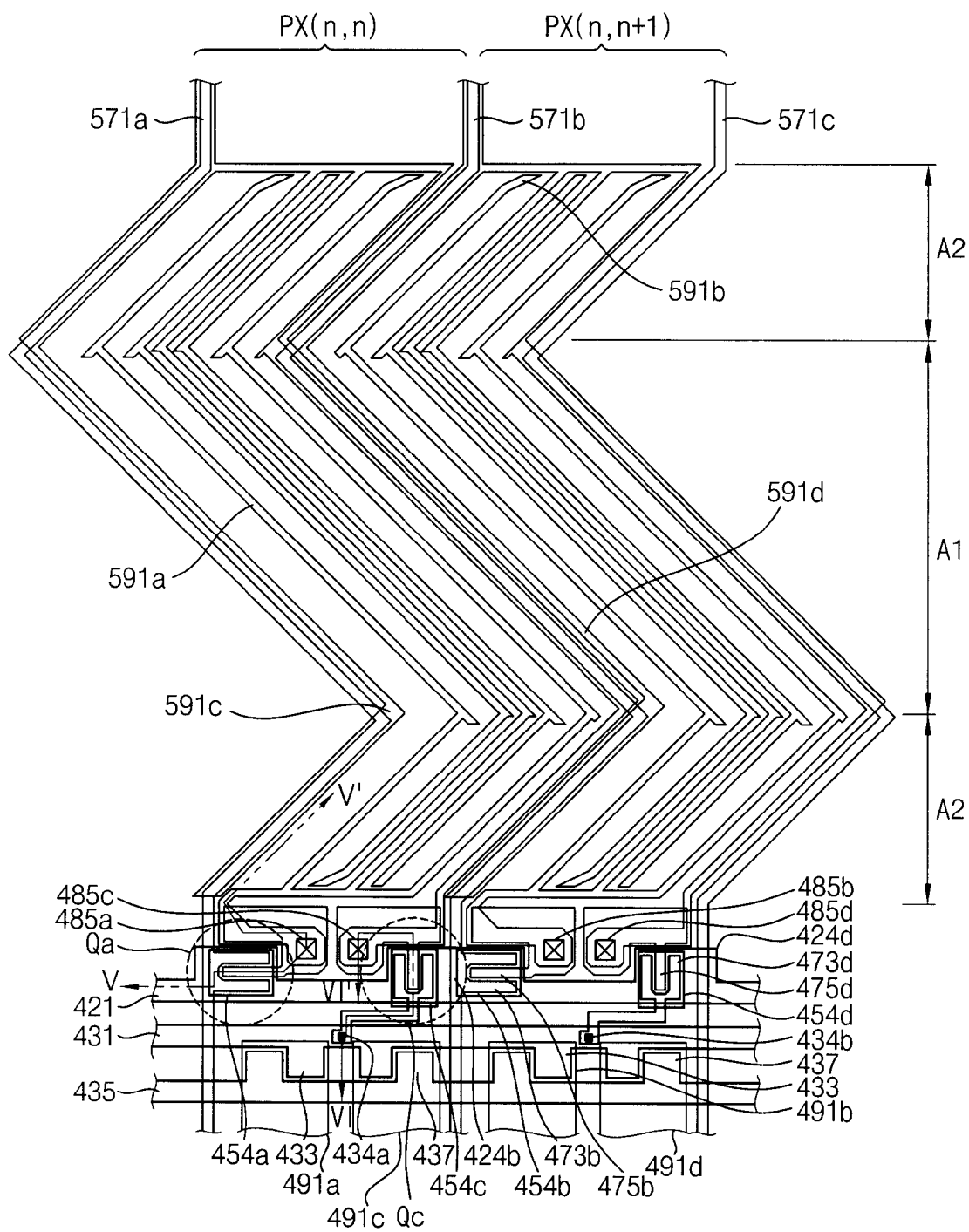
FIG. 9 is a plan view illustrating an LCD device in accordance with still another embodiment of the present invention.

FIG. 9 is a plan view illustrating an LCD device in accordance with still another embodiment of the present invention.

The LCD device of FIG. 9 is same as in FIGS. 5 to 7 except an array substrate 500. Thus, the same reference numerals will be used to refer to the same or like parts as those described in FIGS. 5 to 7 and any further explanation concerning the above elements will be omitted.

Referring to FIGS. 6 to 9, the LCD device includes an array substrate 500, an opposite substrate 200 and a liquid crystal layer 300.

The array substrate 500 of FIG. 9 is same as in FIG. 5 except a first pixel electrode 591a, a second pixel electrode 591b, a first common electrode 591c and a second common electrode 591d. Thus, the same reference numerals will be used for refer to the same or line parts as those described in FIG. 5 and any further explanation concerning the above elements will be omitted. In FIG. 9, a first pixel PX(n,n) and a second pixel PX(n,n+1) of the LCD device are illustrated.

The array substrate 500 includes a lower base substrate 410. A pixel region is defined in the lower base substrate 410.

The lower base substrate 410 has a plate shape. A transparent material that may be used for the lower base substrate 410 may include glass, quartz, synthetic resin, etc. These may be used alone or in a combination thereof.

A data insulating layer 480 is formed on the lower base substrate 410. A plurality of pixel electrodes 591 is formed on the data insulating layer 480. The pixel electrodes 591 includes a first pixel electrode 591*a*, a second pixel electrode 591*b*, a first common electrode 591*c* and a second common electrode 591*d*. The pixel electrodes 591 may include a transparent conductive material, a reflective material, etc. Examples of the transparent conductive material that may be used for the pixel electrodes 591 may include indium tin oxide (ITO), indium zinc oxide (IZO), carbon nano tube (CNT), etc. Examples of the reflective material that may be used for the pixel electrodes 591 may include aluminum, silver, chromium, an alloy thereof, etc. These may be used alone or in a combination thereof.

The first and second pixel electrodes 591*a* and 591*b* and the first and second common electrodes 591*c* and 591*d* are formed on the data insulating layer 480. In another embodiment, a transparent metal layer may be patterned to form the first and second pixel electrodes 591*a* and 591*b* and the first and second common electrodes 591*c* and 591*d*.

The pixel electrodes 591 may have a quadrangular shape.

The first pixel electrode 591*a* is electrically connected to the first drain electrode 475*a*, and the second pixel electrode 591*b* is electrically connected to the second drain electrode 475*b*. The first and second pixel electrodes 591*a* and 591*b* include a plurality of first bending branches that are extended in the horizontal direction and are leftwardly and rightwardly bent to have shapes of inequality sign.

A lower portion and an upper portion of each of the first and second pixel electrodes 591*a* and 591*b* are extended in a first diagonal direction, and a central portion of each of the first and second pixel electrodes 591*a* and 591*b* is extended in a second diagonal direction. The first bending branches surrounds the first and second pixels PX(n,n) and PX(n,n+1). A lower portion and an upper portion of each of the first bending branches are extended in the first diagonal direction, and a central portion of each of the first bending branches is extended in the second diagonal direction.

The first diagonal direction may form an angle of about 45 degrees or about 225 degrees with respect to the gate line 421. The second diagonal direction may form an angle of 135 degrees or about 315 degrees with respect to the gate line 421.

The first common electrode 591*c* is electrically connected to the third drain electrode 475*c*, and the second common electrode 591*d* is electrically connected to the second drain electrode 475*d*. The first and second common electrodes 591*c* and 591*d* include a plurality of second bending branches that are extended in the horizontal direction and are leftwardly and rightwardly bent to have shapes of inequality sign.

A lower portion and an upper portion of each of the first and second common electrodes 591*c* and 591*d* are extended in the first diagonal direction, and a central portion of each of the first and second common electrodes 591*c* and 591*d* is extended in the second diagonal direction. A lower portion and an upper portion of each of the second bending branches are extended in the first diagonal direction, and a central portion of each of the second bending branches is extended in the second diagonal direction.

The first diagonal direction may form an angle of about 45 degrees or about 225 degrees with respect to the gate line 421. The second diagonal direction may form an angle of 135 degrees or about 315 degrees with respect to the gate line 421.

The central portion of the second bending branches of the first and second common electrodes 591*c* and 591*d* is overlapped with the second and third data lines 571*b* and 571*c* in a first area A1.

The lower and upper portions of the second bending branches of the first and second common electrodes 591*c* and 591*d* are overlapped with the first and second data lines 571*a* and 571*b* in a first area A2.

For example, the second bending branches may be overlapped with about a half of the first and second data lines 571*a* and 571*b* in the first pixel PX(n,n), and about a half of the second and third data lines 571*b* and 571*c* in the second pixel P(n,n+1).

Voltages having opposite polarities are applied to adjacent data lines, so that parasite capacitance caused by the data lines may be prevented. Thus, the voltages applied to the data lines have constant level.

That is, the first and second bending branches in each of the first and second pixels PX(n,n) and PX(n,n+1) alternate with each other to form a comb shape.

A distance between the first and second bending branches in a peripheral region of the first and second pixels PX(n,n) and PX(n,n+1) is greater than a distance between the first and second bending branches in a central region of the first and second pixels PX(n,n) and PX(n,n+1).

The first pixel electrode 591*a* is physically and electrically connected to the first drain electrode 475*a* through the first contact hole 485*a* to receive a voltage from the first drain electrode 475*a*. The second pixel electrode 591*b* is physically and electrically connected to the second drain electrode 475*b* through the second contact hole 485*b* to receive a voltage from the second drain electrode 475*b*. The first common electrode 591*c* is physically and electrically connected to the third drain electrode 475*c* through the third contact hole 485*c* to receive a voltage from the third drain electrode 475*c*. The second common electrode 591*d* is physically and electrically connected to the fourth drain electrode 475*d* through the fourth contact hole 485*d* to receive a voltage from the fourth drain electrode 475*d*. The first and second pixel electrodes 591*a* and 591*b*, the first and second common electrodes 591*c* and 591*d* and the liquid crystal layer 300 form a liquid crystal capacitor Clc. In the present embodiment, although the first, second, third and fourth switching elements Qa, Qb, Qc and Qd are turned off, a voltage difference between the first and second pixel electrodes 591*a* and 591*b* and the first and second common electrodes 591*c* and 591*d* is maintained.

An equivalent circuit diagram of the LCD device shown in FIG. 9 is the same as the equivalent circuit diagram of FIG. 8. Thus, the same reference numerals will be used to refer to the same or like parts as those described in FIG. 8 and any further explanation concerning the above elements will be omitted.

The method of manufacturing the LCD device of FIG. 9 is the same as the method of manufacturing the LCD device of FIGS. 1 to 4. Thus, the same reference numerals will be used to refer to the same or like parts as those described in FIGS. 1 to 4 and any further explanation concerning the above elements will be omitted.

According to the present embodiment, the adjacent data lines receive the voltages having the different polarities, so that the parasite capacitance between the adjacent data lines may be removed. Thus, the voltage having the constant level may be applied to the data lines.

Figure 10:
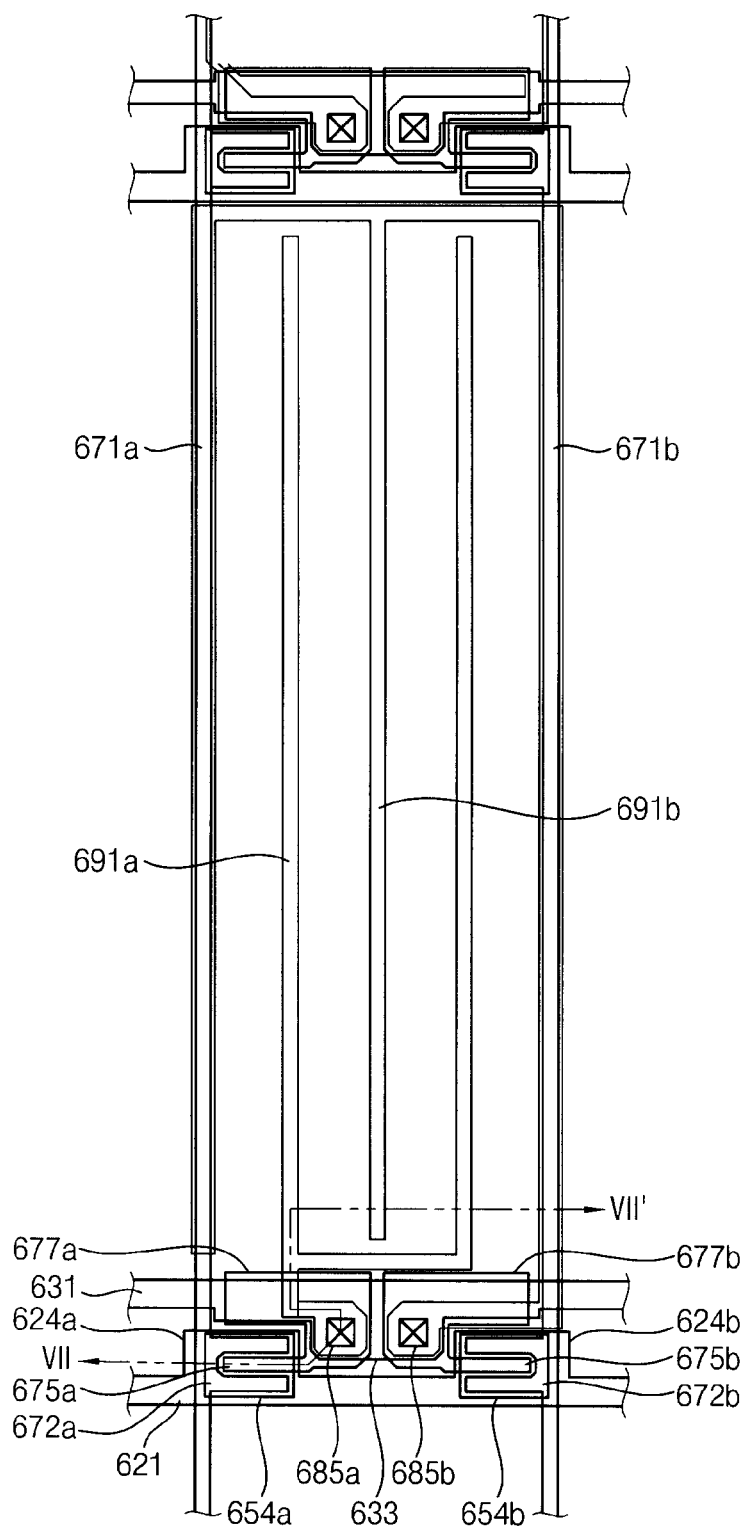
FIG. 10 is a plan view illustrating an LCD device in accordance with further still another embodiment of the present invention.

FIG. 10 is a plan view illustrating an LCD device in accordance with further still another embodiment of the present invention.

The LCD device of FIG. 10 is same as in FIGS. 1 to 4 except an array substrate 600. Thus, the same reference numerals will be used to refer to the same or like parts as those described in FIGS. 1 to 4 and any further explanation concerning the above elements will be omitted.

Referring to FIGS. 6 and 10, the LCD device includes an array substrate 600, an opposite substrate 200 and a liquid crystal layer 300.

The array substrate 600 includes a lower base substrate 610. A pixel region is defined in the lower base substrate 610.

The lower base substrate 610 has a plate shape. A transparent material that may be used for the lower base substrate 610 may include glass, quartz, synthetic resin, etc.

A gate metal layer is formed on the lower base substrate 610. The gate metal layer may include a gate line 621 and a storage line 631.

The gate line 621 is extended in a longitudinal direction to transmit a gate signal. Each of the gate lines 621 includes a first gate electrode 624a and a second gate electrode 624b.

The storage line 631 receives a voltage such as a common voltage, and is extended in the longitudinal direction. Each of the storage lines 631 is interposed between two adjacent gate lines 621, and is adjacent to a lower gate line 621 of the two adjacent gate lines 621. The storage line 631 includes a storage electrode 633. The storage electrode 633 has substantially rectangular shape, and two lower corners of the storage electrode 633 are chamfered. Alternatively, the storage electrode 633 may have various shapes and arrangements.

The gate insulating layer 640 is formed on the lower base substrate 610 to cover the gate line 621, the first and second gate electrodes 624a and 124b, the storage line 631 and the storage electrode 633.

A first semiconductor layer 654a and a second semiconductor layer 654b are formed on the gate insulating layer 640. The first and second semiconductor layers 654a and 654b may include hydrogenated amorphous silicon, polycrystalline silicon, etc. The first and second semiconductor layers 654a and 654b are formed on the first and second gate electrodes 624a and 624b, respectively.

Two first ohmic contact layers 663a and 665a are formed on the first semiconductor layers 654a. Two second ohmic contact layers 663b and 665b are formed on the second semiconductor layers 654b. The first and second ohmic contact layers 663a and 665a may include n+ hydrogenated amorphous silicon that is implanted by n type impurities at a high concentration, silicide, etc.

A data metal layer including a first data line 671a, a second data line 671b, a first drain electrode 675a and a second drain electrode 675b is formed on the ohmic contact layers 663a and 665a and the gate insulating layer 640.

The first and second data lines 671a and 671b transmit data signals, and are extended in the horizontal direction crossing the gate line 621 and the storage line 631.

The first data line 67 la includes a first source electrode 673a bent toward the first gate electrode 624a. The second data line 671b includes a second source electrode 673b bent toward the second gate electrode 624b.

An end of a rod shape of each of the first and second drain electrodes 675a and 675b faces each of the first and second source electrodes 673a and 673b, and is surrounded by each of the first and second source electrodes 673a and 673b.

A first contact electrode 677a connected to the first drain electrode 675a is overlapped with a left half of the storage electrode 633, and a second contact electrode 677b connected to the second drain electrode 675b is overlapped with a right half of the storage electrode 633.

The first gate electrode 624a, the first source electrode 673a, the first drain electrode 675a and the first semiconductor layer 654a form a first switching element Qa. The second gate electrode 624b, the second source electrode 673b, the second drain electrode 675b and the second semiconductor layer 654b form a second switching element Qb.

A channel of the first switching element Qa is formed in the first semiconductor layer 654a between the first source electrode 673a and the first drain electrode 675a. A channel of the second switching element Qb is formed in the second semiconductor layer 654b between the second source electrode 673b and the second drain electrode 675b.

A first one 663a of the two first ohmic contact layers 663a and 665a is interposed between the first semiconductor layer 654a and the first source electrode 673a to decrease contact resistance between the first semiconductor layer 654a and the first source electrode 673a, and a second one 665a of the two first ohmic contact layers 663a and 665a is interposed between the first semiconductor layer 654a and the first drain electrode 675a to decrease contact resistance between the first semiconductor layer 654a and the first drain electrode 675a. A first one 663b of the two second ohmic contact layers 663b and 665b is interposed between the second semiconductor layer 654b and the second source electrode 673b to decrease contact resistance between the second semiconductor layer 654b and the second source electrode 673b, and a second one 665b of the two second ohmic contact layers 663b and 665b is interposed between the second semiconductor layer 654b and the second drain electrode 675b to decrease contact resistance between the second semiconductor layer 654b and the second drain electrode 675b.

A data insulating layer 680 is formed on the gate insulating layer 640 to cover the first data lines 671a and 671b, the first and second source electrodes 673a and 673b, and the first and second drain electrodes 675a and 675b.

A first contact hole 685a is formed on the first contact electrode 677a through the data insulating layer 680. A second contact hole 685b is formed on the second contact hole 677b through the data insulating layer 680.

The pixel electrode 691a and the common electrode 691b are formed on the data insulating layer 680. The pixel electrode 691a and the common electrode 691b may include a transparent conductive material, a reflective material, etc. Examples of the transparent conductive material that may be used for the pixel electrode 691a and the common electrode 691b may include indium tin oxide (ITO), indium zinc oxide (IZO), carbon nano tube (CNT), etc. Examples of the reflective material that may be used for the pixel electrode 691a and the common electrode 691b may include aluminum, silver, chromium, an alloy thereof, etc. These may be used alone or in a combination thereof.

The pixel electrode 691a and the common electrode 691b are formed on the data insulating layer 680. Alternatively, a transparent metal layer may be patterned to form the pixel electrode 691a and the common electrode 691b.

The pixel electrode 691a makes contact with the first contact electrode 677a.

The common electrode 691b makes contact with the second contact electrode 677b.

A contour formed by the pixel electrode 691a and the common electrode 691b may have a quadrangular shape.

The pixel electrode 691a includes a first central extension electrically connected to the first drain electrode 675a and extended in a horizontal direction.

The common electrode 691b includes a second central extension electrically connected to the second drain electrode 675b and extended in the horizontal direction. The second central extension surrounds the pixel region PX. Also, the second central extension may be overlapped with the first and second data lines 671a and 671b.

Different voltages having opposite polarities are applied to the first and second data lines 671a and 671b, so that parasite capacitance caused by the first and second data lines 671a and 671b may be removed.

For example, the pixel electrode 691a includes a plurality of first branching parts extended from a lower portion of the pixel region PX toward an upper portion of the pixel region PX. The common electrode 691b includes a plurality of second branching parts extended from the upper portion of the pixel region PX toward the lower portion of the pixel region PX. Thus, the first branching parts of the pixel electrode 691a and the second branching parts of the common electrode 691b alternate with each other to form a comb shape.

The pixel electrode 691a is physically and electrically connected to the first drain electrode 675a through the first contact hole 685a to receive a data voltage from the first drain electrode 675a. The common electrode 691b is physically and electrically connected to the second drain electrode 675b through the second contact hole 685b to receive a data voltage from the second drain electrode 675b. The pixel electrode 691a, the common electrode 691b and the liquid crystal layer 300 form a liquid crystal capacitor Clc. In the present embodiment, a voltage difference between the pixel electrode 691a and the common electrode 691b is maintained for a frame, although the first and second switching elements are turned off.

The first contact electrode 677a of the first drain electrode 675a electrically connected to the pixel electrode 691a is overlapped with the storage electrode 633 with interposing the gate insulating layer 640 between the first contact electrode 677a and the storage electrode 633 to form a first storage capacitor Csta. The second contact electrode 677b of the second drain electrode 675b electrically connected to the common electrode 691b is overlapped with the storage electrode 633 with interposing the gate insulating layer 640 between the second contact electrode 677b and the storage electrode 633 to form a second storage capacitor Cstb. The first and second storage capacitors Csta and Cstb maintain the voltage difference of the liquid crystal capacitor Clc.

The lower alignment layer 61 is formed on the lower base substrate 610 including the pixel electrode 691a and the common electrodes 691b to align liquid crystal molecules of the liquid crystal layer 300 in a vertical direction. Thus, the liquid crystal molecules of the liquid crystal layer 300 are aligned from the array substrate 600 toward the opposite substrate 200.

Figure 11:
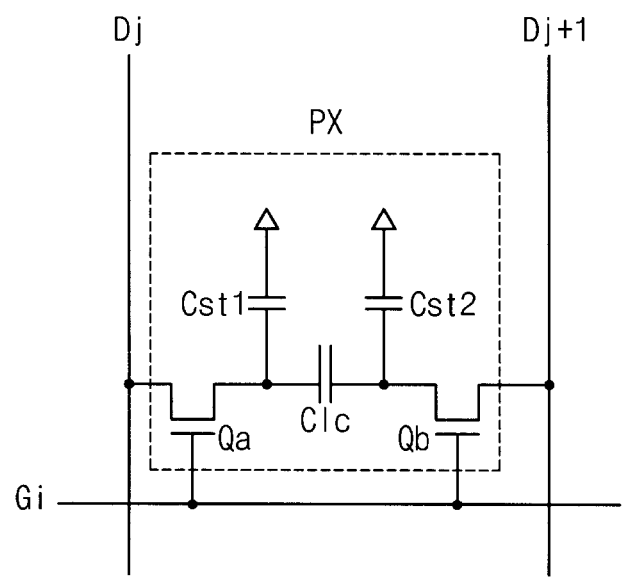
FIG. 11 is an equivalent circuit diagram illustrating the LCD device shown in FIG. 10.

FIG. 11 is an equivalent circuit diagram illustrating the LCD device shown in FIG. 10.

Referring to FIGS. 10 and 11, the LCD device includes a plurality of pixels electrically connected to a plurality of signal lines Dj, Dj+1 and Gi.

In FIG. 10, the LCD device includes the array substrate 600, the opposite substrate 200 facing the array substrate 600, and the liquid crystal layer 300 interposed between the array substrate 600 and the opposite substrate 200.

The signal lines Dj, Dj+1 and Gi includes a gate line Gi, a first data line Dj and a second data line Dj+1. The gate line Gi transmits a gate signal (a scan signal). The first and second data lines Dj and Dj+1 transmit a data voltage. A plurality of the gate lines Gi is extended in a column direction, and is substantially parallel with each other. The first data line Dj and the second data line Dj+1 are extended in a row direction, and are substantially parallel with each other.

Voltages having opposite polarities are applied to the first data line Dj and the second data line Dj+1.

For example, the first and second data lines Dj and Dj+1 of FIG. 11 correspond to the first and second data lines 671a and 671b of FIG. 10 formed in the pixel region PX. The gate line Gi of FIG. 11 corresponds to the gate line 621 of FIG. 10. The first and second switching transistors Qa and Qb are electrically connected to the first and second data lines 671a and 671b, respectively.

Referring again to FIG. 11, the first and second data lines Dj and Dj+1 are electrically connected to the first and second switching elements Qa and Qb, respectively.

Referring again to FIGS. 10 and 11, the storage line 131 is overlapped with the pixel electrodes electrically connected to the first and second switching elements Qa and Qb to form the first and second storage capacitors Cst1 and Cst2.

The liquid crystal layer 300 in the pixel region PX functions as a dielectric material of the liquid crystal capacitor Clc. The liquid crystal capacitor Clc is formed by the pixel electrode, the common electrode and the liquid crystal layer 300.

The liquid crystal layer 300 has dielectric anisotropy. When the electric field is not applied to the liquid crystal layer 300, the liquid crystal molecules of the liquid crystal layer 300 are vertically aligned between the array substrate 600 and the opposite substrate 200.

Hereinafter, a method of manufacturing the array substrate will be explained with reference to FIGS. 10 and 11.

The gate line 621 and the storage line 631 substantially parallel with each other are formed on the lower base substrate 610.

The first gate electrode 624a, the second gate electrode 624b and the storage electrode 633 are formed.

The gate insulating layer 640 is then formed on the lower base substrate 610.

A data metal layer including the first and second data lines 671a and 671b, the first and second drain electrodes 675a and 675b and the first and second source electrodes 673a and 673b is then formed.

The first and second data lines 671a and 671b are substantially parallel with each other.

The data insulating layer 680 is then formed.

The pixel electrode 691a and the common electrodes 691b are then formed. The common electrode 691b is overlapped with the first and second data lines 671a and 671b.

The lower alignment layer 61 is then formed.

Different voltages having opposite polarities are alternately applied to the signal lines Dj, Dj+1 and Gi, so that a line inversion is performed in the LCD device in every frame.

According to the present embodiment, the voltages having the different polarities are applied to the first and second data lines 671a and 671b, thereby preventing a parasite capacitance caused by the first and second data lines 671a and 671b. Thus, the voltages applied to the data lines maintain constant level.

Figure 12:
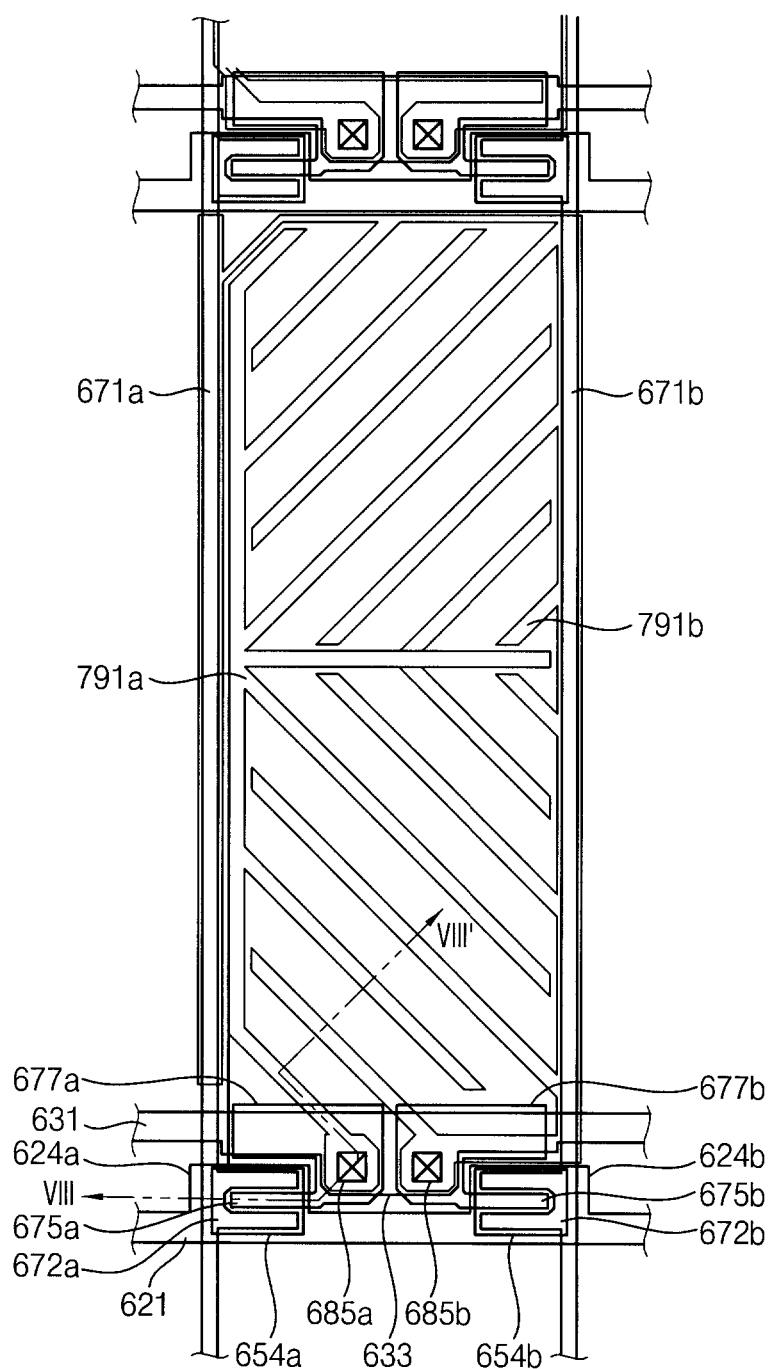
FIG. 12 is a plan view illustrating an LCD device in accordance with further still another embodiment of the present invention.

FIG. 12 is a plan view illustrating an LCD device in accordance with further still another embodiment of the present invention.

The LCD device of FIG. 12 is same as in FIGS. 1 to 4 except an array substrate 700. Thus, the same reference numerals will be used to refer to the same or like parts as those described in FIGS. 1 to 4 and any further explanation concerning the above elements will be omitted.

Also, the array substrate 700 of FIG. 12 is same as in FIG. 10 except a pixel electrode 791a and a common electrode 791b. Thus, the same reference numerals will be used for refer to the same or line parts as those described in FIG. 10 and any further explanation concerning the above elements will be omitted.

A data insulating layer 680 is formed on a lower base substrate 610. The pixel electrode 791a and the common electrode 791b are formed on the data insulating layer 680. The pixel electrode 791a and the common electrode 791b may include a transparent conductive material, a reflective material, etc. Examples of the transparent conductive material that may be used for the pixel electrode 791a and the common electrode 791b may include indium tin oxide (ITO), indium zinc oxide (IZO), carbon nano tube (CNT), etc. Examples of the reflective material that may be used for the pixel electrode 791a and the common electrode 791b may include aluminum, silver, chromium, an alloy thereof, etc. These may be used alone or in a combination thereof.

The pixel electrode 791a and the common electrode 791b are formed on the data insulating layer 780. In another embodiment, a transparent metal layer may be patterned to form the pixel electrodes 791a and the common electrode 791b.

The pixel electrode 791a makes contact with the first contact electrode 677a.

The common electrode 791b makes contact with the second contact electrode 677b.

A contour formed by the pixel electrode 791a and the common electrode 791b may have a quadrangular shape.

The pixel electrode 791a includes a first central extension, a first main branching part and a first branching part. The first central extension is electrically connected to the first drain electrode 675a and extended in a horizontal direction. The main first branching part crosses a center of the first central extension in a longitudinal direction. An upper portion of the first branching part is extended in a first diagonal direction, and a lower portion of the first branching part is extended in a second diagonal direction. The first diagonal direction forms an angle of about 45 degrees or about 225 degrees with respect to the gate line 621, and the second diagonal direction forms an angle of about 135 degrees or about 315 degrees with respect to the gate line 621.

The common electrode 791b includes a second central extension, a second main branching part and a second branching part. The second central extension is electrically connected to the second drain electrode 675b and extended in the horizontal direction. The second main branching part crosses a center of the second central extension in the longitudinal direction. An upper portion of the second branching part is extended in the first diagonal direction, and a lower portion of the second branching part is extended in the second diagonal direction. The first diagonal direction forms an angle of about 45 degrees or about 225 degrees with respect to the gate line 621, and the second diagonal direction forms an angle of about 135 degrees or about 315 degrees with respect to the gate line 621.

The second branching part may surround a pixel region, and may be overlapped with the first and second data lines 671a and 671b.

Thus, the first branching parts of the pixel electrode 791a and the second branching parts of the common electrode 791b alternate with each other to form a comb shape.

An equivalent circuit diagram of the LCD device shown in FIG. 12 is the same as the equivalent circuit diagram of FIG. 1. Thus, the same reference numerals will be used to refer to the same or like parts as those described in FIG. 11 and any further explanation concerning the above elements will be omitted.

The method of manufacturing the LCD device of FIG. 12 is the same as the method of manufacturing the LCD device of FIGS. 10 and 11. Thus, the same reference numerals will be used to refer to the same or like parts as those described in FIGS. 10 and 11 and any further explanation concerning the above elements will be omitted.

Figure 13:
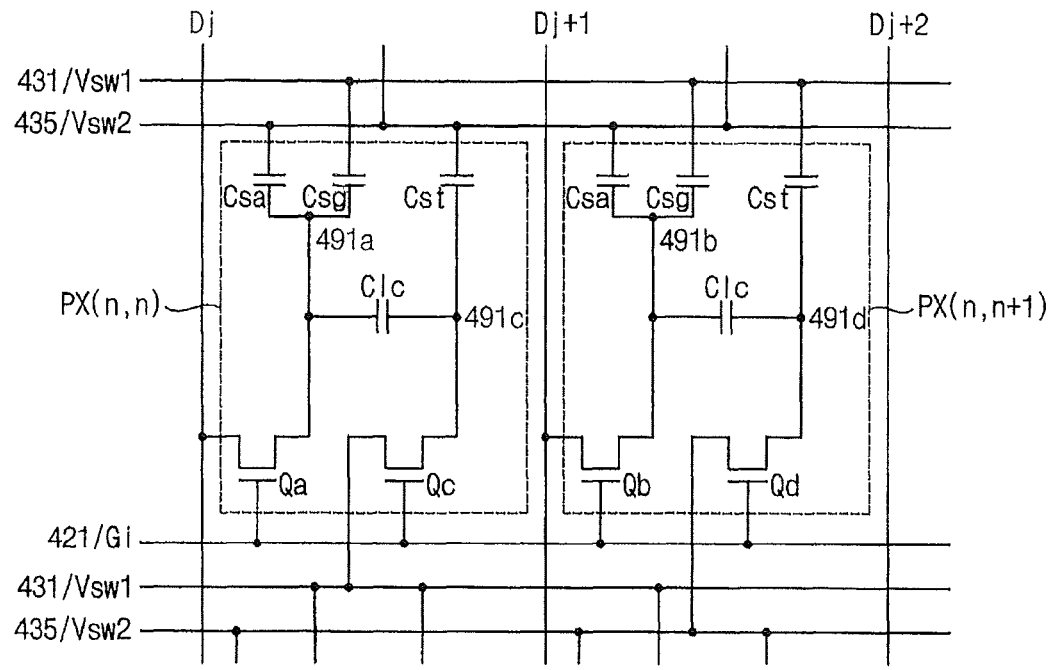
FIG. 13 is an equivalent circuit diagram illustrating pixels of an LCD device in accordance with still another embodiment of the present invention.

FIG. 13 is an equivalent circuit diagram illustrating pixels of an LCD device in accordance with still another embodiment of the present invention.

The LCD device of FIG. 13 is same as in FIG. 8 except that the LCD device of FIG. 13 includes a first swing voltage line Vsw1 and a second swing voltage line Vsw2 substituted for the ground line GND and the power supply line ADD, and a third storage capacitor Cst is connected to the first common electrode 471c substituted for the first and second storage capacitors Csa and Csg. Thus, the same reference numerals will be used to refer to the same or like parts as those described in FIG. 8 and any further explanation concerning the above elements will be omitted.

For example, a constant ground voltage and a constant power voltage respectively applied to the ground line GND and the power supply line ADD are respectively replaced by voltages applied to the first and second swing voltage lines Vsw1 and Vsw2. The voltages applied to the first and second swing voltages lines Vsw1 and Vsw2 swing the ground voltage and the power voltage frame by frame. In this case, the voltage applied to the first swing voltage line Vsw1 may have a polarity opposite to that of the voltage applied to the second swing voltage line Vsw2.

As illustrated in FIG. 13, first and second pixels PX(n, n) and PX(n, n+1) are illustrated.

Plan views and cross-sectional views illustrating the LCD device of FIG. 13 is same as the plan views and the cross-sectional views illustrating the LCD device of FIGS. 5 to 7, except that the first and second common electrodes 491c and 491d do not overlap with the first power electrode 433 but overlap with the second power electrode 437. Thus, the same reference numerals will be used to refer to the same or like parts as those described in FIGS. 5 to 7 and any further explanation concerning the above elements will be omitted.

Referring to FIGS. 5, 8 and 13, the first power line 431 corresponds to the first swing voltage line Vsw1, and the second power line 435 corresponds to the second swing voltage line Vsw2.

In the first pixel PX(n, n), the ground voltage or the power voltage applied to the first swing voltage line Vsw1 may be discharged to the first common electrode 491c using the third switching element Qc. The second power electrode 437 of the second swing voltage line Vsw2 and the first common electrode 491c may overlap with each other to form the third storage capacitor Cst.

In this case, the size of the third storage capacitor Cst is substantially same as the sum of the sizes of the first and second storage capacitors Csa and Csg.

In the second pixel PX(n, n+1), the ground voltage or the power voltage applied to the second swing voltage line Vsw2 may be discharged to the second common electrode 491d using the fourth switching element Qd. The first power electrode 433 of the first swing voltage line Vsw1 and the second common electrode 491d may overlap with each other to form the third storage capacitor Cst.

Figure 14:
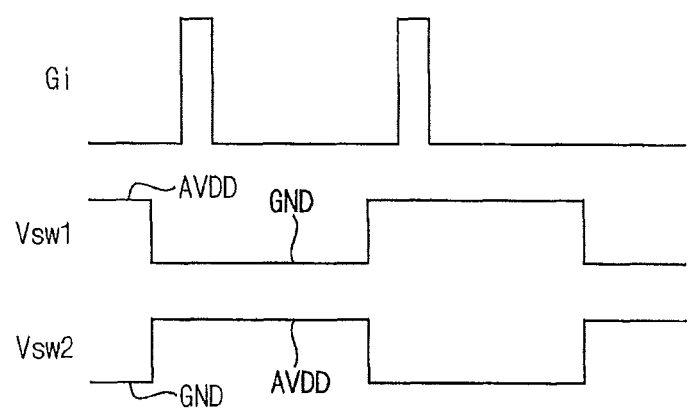
FIG. 14 is waveform diagrams of voltages applied to a first gate line, a first swing voltage line and a second swing voltage line of FIG. 13.

FIG. 14 is waveform diagrams of voltages applied to a first gate line, a first swing voltage line and a second swing voltage line of FIG. 13.

Referring to FIGS. 13 and 14, when the ground voltage is applied to the first swing voltage line Vsw1, the power voltage is applied to the second swing voltage line Vsw2. Alternatively, when the power voltage is applied to the first swing voltage line Vsw1, the ground voltage may be applied to the second swing voltage line Vsw2.

In this case, the voltages applied to the first and second swing voltage lines Vsw1 and Vsw2 do not synchronize with the voltage of the first gate line Gi, and swing before the first gate line Gi swings.

In the LCD devices of FIGS. 5 and 13, the first and second pixel electrodes 491a and 491b overlap with the first and second power electrodes 433 and 437 to form the first and second storage capacitors Csg and Csa, respectively.

In the LCD device of FIG. 5, the first common electrode 491c does not overlaps with the first power electrodes 433, and the second common electrode 491d does not overlaps with the first power electrodes 433. However, in the LCD device of FIG. 13, the first common electrode 491c overlaps with the second power electrode 437 and the second common electrode 491d overlaps with the second power electrode 437.

According to the present example embodiment, the size of the third storage capacitor Cst is substantially same as the sum of the sizes of the first and second storage capacitors Csa and Csg, so that a deviation between the kickback voltages due to an unequal size between the storage capacitors may be decreased.

In addition, the first and second storage capacitors Csa and Csg and the third storage capacitor Cst are formed using the first and second swing voltage lines Vsw1 and Vsw2, so that an aperture ratio may be enhanced.

Figure 15:
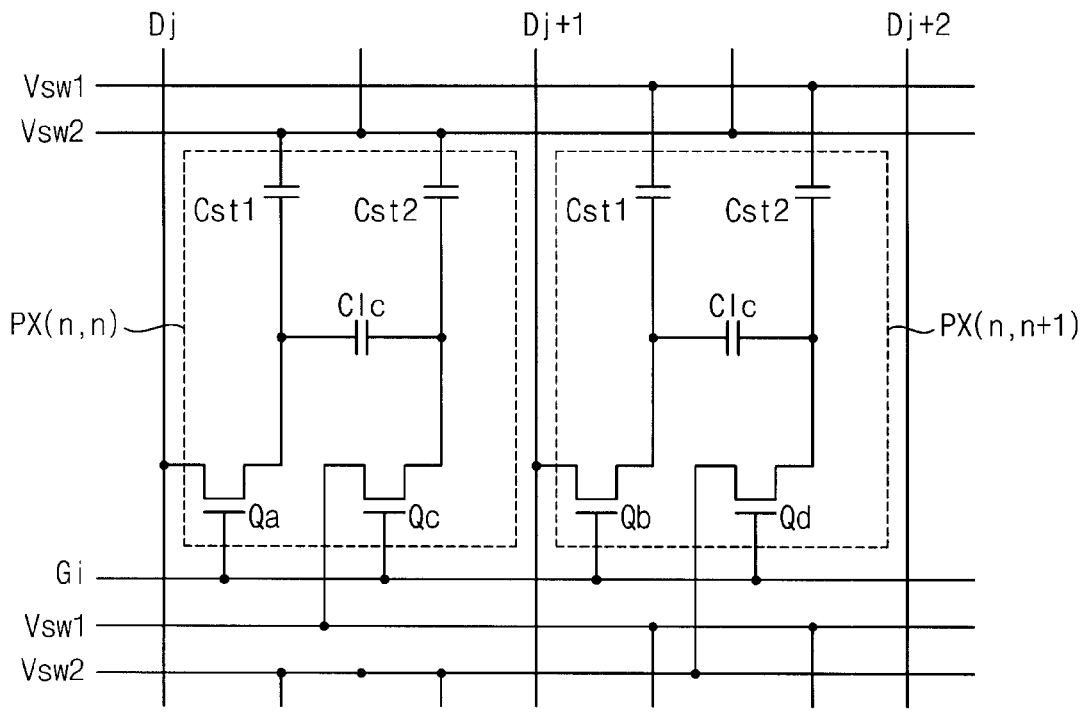
FIG. 15 is an equivalent circuit diagram illustrating pixels of an LCD device in accordance with still another embodiment of the present invention.

FIG. 15 is an equivalent circuit diagram illustrating pixels of an LCD device in accordance with still another embodiment of the present invention.

The LCD device of FIG. 15 is same as in FIG. 13 except that the LCD device of FIG. 15 includes a first storage capacitor Cst1 substituted for the first and second storage capacitors Csa and Csg, and a second storage capacitor Cst2 substituted for the third storage capacitor Cst. Thus, the same reference numerals will be used to refer to the same or like parts as those described in FIG. 13 and any further explanation concerning the above elements will be omitted.

Plan views and cross-sectional views illustrating the LCD device of FIG. 15 is same as the plan views and the cross-sectional views illustrating the LCD device of FIGS. 5 to 7, except that the first pixel electrode 491a and the first common electrodes 491c overlap with the second power electrode 437, and the second pixel electrode 491b and the second common electrode 491d overlap with the first power electrode 433. Thus, the same reference numerals will be used to refer to the same or like parts as those described in FIGS. 5 to 7 and any further explanation concerning the above elements will be omitted.

Referring to FIGS. 5 to 7, and FIGS. 13 to 15, the first power line 431 corresponds to the first swing voltage line Vsw1, and the second power line 435 corresponds to the second swing voltage line Vsw2.

In the first pixel PX(n, n), a data voltage applied from the first data line Dj may be discharged to the first pixel electrode by the first switching element Qa, and the second power electrode 437 of the second swing voltage line Vsw2 and the first pixel electrode 491a may overlap with each other to form the first storage capacitor Cst1.

In the first pixel PX(n, n), the ground voltage or the power voltage applied from the first swing voltage line Vsw1 may be discharged to the first common electrode 491c by the third switching element Qc, and the second power electrode 437 of the second swing voltage line Vsw2 and the first common electrode 491c may overlap with each other to form the second storage capacitor Cst2.

In the second pixel PX(n, n+1), the data voltage applied from the second data line Dj+1 may be discharged to the second pixel electrode 491b by the second switching element Qb, and the first power electrode 433 of the first swing voltage line Vsw1 and the second pixel electrode 491b may overlap with each other to form the first storage capacitor Cst1.

In the second pixel PX(n, n+1), the ground voltage or the power voltage applied from the second swing voltage line Vsw2 may be discharged to the second common electrode 491d by the fourth switching element Qd, and the first power electrode 433 of the first swing voltage line Vsw1 and the second common electrode 491d may overlap with each other to form the second storage capacitor Cst2.

In this case, the size of the first storage capacitor Cst1 may be substantially same as that of the second storage capacitor Cst2.

In the example embodiment, the first and second storage capacitors Cst1 and Cst2 formed by the first and second swing voltage lines Vsw1 and Vsw2 disposed over the first and second pixels PX(n, n) and PX(n, n+1), respectively, are illustrated. Alternatively, the first and second storage capacitors Cst1 and Cst2 may be formed by the first and second swing voltage lines Vsw1 and Vsw2 disposed under the first and second pixels PX(n, n) and PX(n, n+1), respectively.

In the LCD device of FIG. 5, the first and second pixel electrodes 491a and 491b, and the first and second common electrodes 491c and 491d overlap with the first and second power electrodes 433 and 437, respectively. However, in the LCD device of FIG. 15, each of the first and second pixel electrodes 491a and 491b, and each of the first and second common electrodes 491c and 491d overlap with one of the first and second power electrodes 433 and 437.

Thus, the size of the second storage capacitor Cst2 is adjusted to that of the first storage capacitor Cst1, so that the deviation between the kickback voltages due to the unequal size between the storage capacitors may be decreased.

In addition, the third switching elements Qc adjacent to each other of adjacent pixels are alternately connected to the first and second swing voltage lines Vsw1 and Vsw2, and the first and second storage capacitors Cst1 and Cst2 of each pixel are connected to the swing voltage line opposite to the swing voltage line connected to the third switching element Qc. Thus, the dot inversion may be performed.

Figure 16:
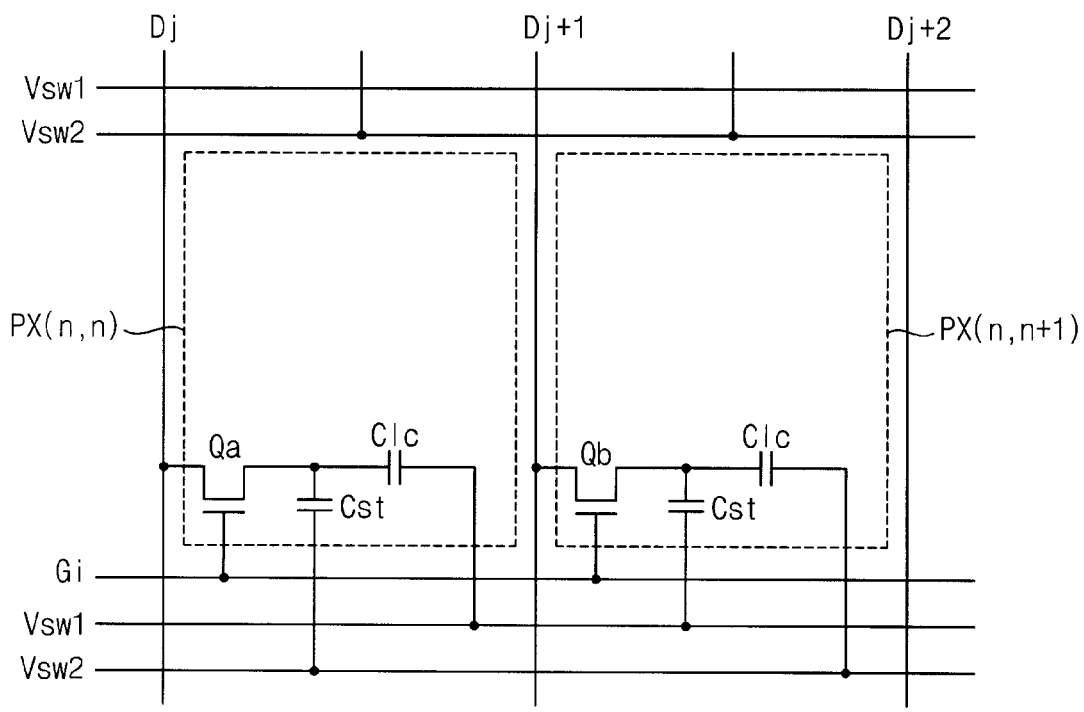
FIG. 16 is an equivalent circuit diagram illustrating pixels of an LCD device in accordance with still another embodiment of the present invention.

FIG. 16 is an equivalent circuit diagram illustrating pixels of an LCD device in accordance with still another embodiment of the present invention.

The LCD device of FIG. 16 is same as in FIG. 15 except that the LCD device of FIG. 16 includes a storage capacitor Cst substituted for the first storage capacitor Cst1, and does not include the second storage capacitor Cst2. Thus, the same reference numerals will be used to refer to the same or like parts as those described in FIG. 15 and any further explanation concerning the above elements will be omitted.

Plan views and cross-sectional views illustrating the LCD device of FIG. 16 is same as the plan views and the cross-sectional views illustrating the LCD device of FIGS. 5 to 7, except that the LCD device of FIG. 16 does not include the third and fourth switching elements Qc and Qd, the first and second common electrodes 491c and 491d respectively receive the voltages from the first and second swing voltage lines Vsw1 and Vsw2, and the first and second pixel electrodes 491a and 491b overlap with the second power electrode 437 or the first power electrode 433. Thus, the same reference numerals will be used to refer to the same or like parts as those described in FIGS. 5 to 7 and any further explanation concerning the above elements will be omitted.

Referring to FIGS. 5 to 7, 15 and 16, in the first pixel PX(n, n), the data voltage applied from the first data line Dj may be discharged to the first pixel electrode 491a by the first switching element Qa, and the first swing voltage line Vsw1 is directly applied to the first common electrode 491c. Thus, the liquid crystal capacitor may be formed between the first pixel electrode 491a and the first common electrode 491c.

The second power electrode 437 of the second swing voltage line Vsw2 and the first pixel electrode 491a may overlap with each other to form the storage capacitor Cst.

In the second pixel PX(n, n+1), the data voltage applied from the second data line Dj+1 may be discharged to the second pixel electrode 491a by the second switching element Qb, and the voltage of the second swing voltage line Vsw2 is directly applied to the second common electrode 491d. Thus, the liquid crystal capacitor may be formed between the second pixel electrode 491b and the second common electrode 491d.

The first power electrode 433 of the first swing voltage line Vsw1 and the second pixel electrode 491b may overlap with each other to form the storage capacitor Cst.

In the LCD device of FIG. 5, each of the first and second pixel electrodes 491a and 491b, and each of the first and second common electrodes 491c and 491d overlap with the first and second power electrodes 433 and 437. However, in the LCD device of FIG. 16, each of the first and second pixel electrodes 491a and 491b overlaps with the first power electrode 433 or the second power electrode 437.

In this case, each of the first and second common electrodes 491c and 491d of adjacent pixels are alternately connected to the first and second swing voltage lines Vsw1 and Vsw2, so that the dot inversion may be performed.

In addition, the voltages of the first and second swing voltage lines Vsw1 and Vsw2 may be respectively applied to the first and second pixel electrodes 491a and 491b, before the first gate signal Gi is applied.

Figure 17:
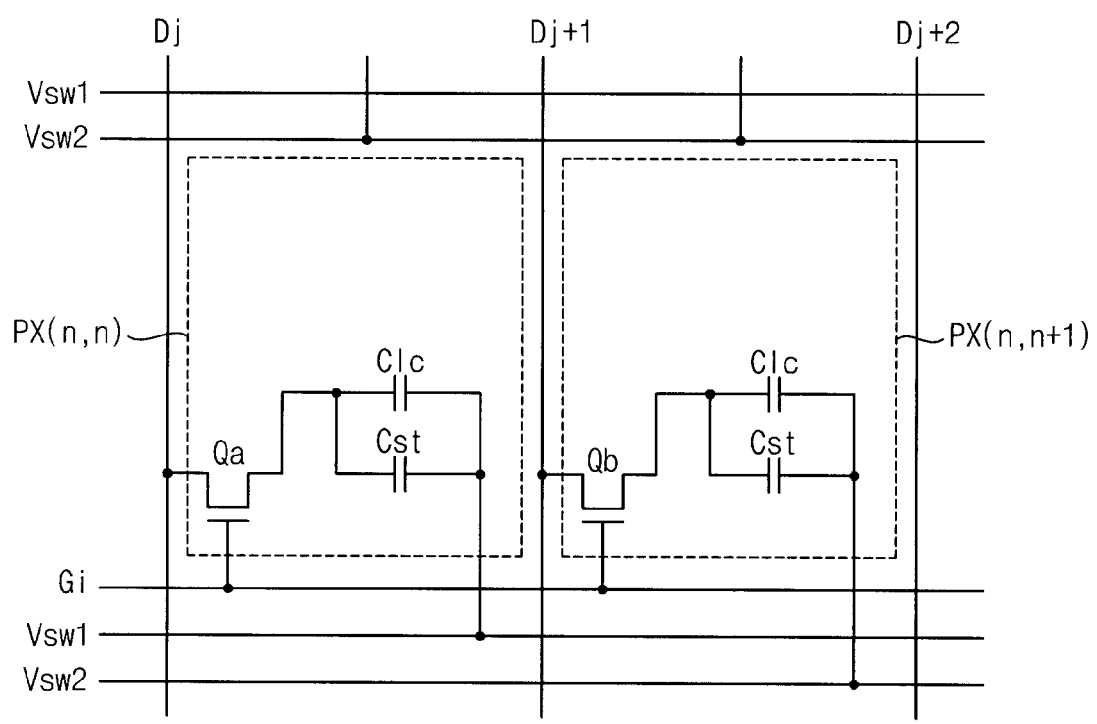
FIG. 17 is an equivalent circuit diagram illustrating pixels of an LCD device in accordance with still another embodiment of the present invention.

FIG. 17 is an equivalent circuit diagram illustrating pixels of an LCD device in accordance with still another embodiment of the present invention.

The LCD device of FIG. 17 is same as in FIG. 16 except for the storage capacitors Cst connected to the first swing voltage line Vsw1 substituted for the second swing voltage line Vsw2. Thus, the same reference numerals will be used to refer to the same or like parts as those described in FIG. 16 and any further explanation concerning the above elements will be omitted.

Plan views and cross-sectional views illustrating the LCD device of FIG. 17 is same as the plan views and the cross-sectional views illustrating the LCD device of FIGS. 5 to 7, except that the LCD device of FIG. 17 does not include the third and fourth switching elements Qc and Qd, the first and second common electrodes 491c and 491d respectively receive the voltages from the first and second swing voltage lines Vsw1 and Vsw2, and the first and second pixel electrodes 491a and 491b overlap with the second power electrode 437 or the first power electrode 433. Thus, the same reference numerals will be used to refer to the same or like parts as those described in FIGS. 5 to 7 and any further explanation concerning the above elements will be omitted.

Referring to FIGS. 16 and 17, in the first pixel PX(n, n), the data voltage applied from the first data line Dj may be discharged to the first pixel electrode 491a by the first switching element Qa, and the voltage of the first swing voltage line Vsw1 is directly applied to the first common electrode 491c. Thus, the liquid crystal capacitor may be formed between the first pixel electrode 491a and the first common electrode 491c.

The first power electrode 433 of the first swing voltage line Vsw2 and the first pixel electrode 491a overlap with each other to form the storage capacitor Cst.

In the second pixel PX(n, n+1), the data voltage applied from the second data line Dj+1 may be discharged to the second pixel electrode 491b by the second switching element Qb, and the voltage of the second swing voltage line Vsw2 is directly applied to the second common electrode 491d. Thus, the liquid crystal capacitor may be formed between the second pixel electrode 491b and the second common electrode 491d.

The second power electrode 437 of the second swing voltage line Vsw2 and the second pixel electrode 491b overlap with each other to form the storage capacitor Cst.

In the LCD device of FIG. 5, each of the first and second pixel electrodes 491a and 491b, and each of the first and second common electrodes 491c and 491d overlap with the first and second power electrodes 433 and 437. However, in the LCD device of FIG. 17, each of the first and second pixel electrodes 491a and 491b overlaps with the first power electrode 433 or the second power electrode 437.

In this case, each of the first and second common electrodes 491c and 491d of adjacent pixels are alternately connected to the first and second swing voltage lines Vsw1 and Vsw2, so that the dot inversion may be performed.

In addition, the voltages of the first and second swing voltage lines Vsw1 and Vsw2 may be respectively applied to the first and second pixel electrodes 491a and 491b, before the first gate signal Gi is applied.

Figure 18:
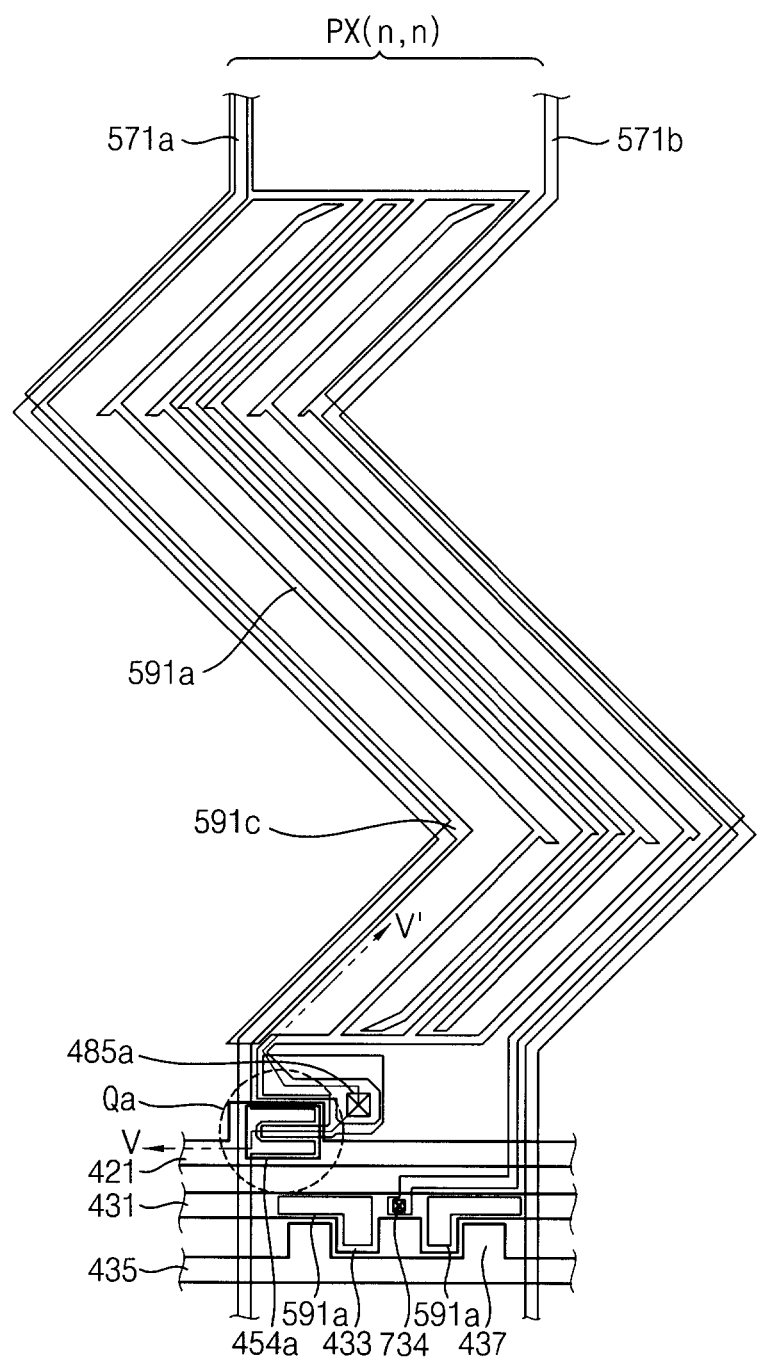
FIG. 18 is a plan view illustrating an LCD device in accordance with still another embodiment of the present invention.

FIG. 18 is a plan view illustrating an LCD device in accordance with still another embodiment of the present invention.

Plan views and cross-sectional views illustrating the LCD device of FIG. 18 is same as the plan views and the cross-sectional views illustrating the LCD device of FIG. 9, except that the LCD device of FIG. 18 does not include the third switching elements Qc corresponding to the first pixel PX(n, n), the first common electrodes 591c receives the voltage from the first swing voltage line Vsw1, and only the first pixel electrode 591a overlaps with the first power electrode 433. Thus, the same reference numerals will be used to refer to the same or like parts as those described in FIG. 9 and any further explanation concerning the above elements will be omitted.

Figure 19:
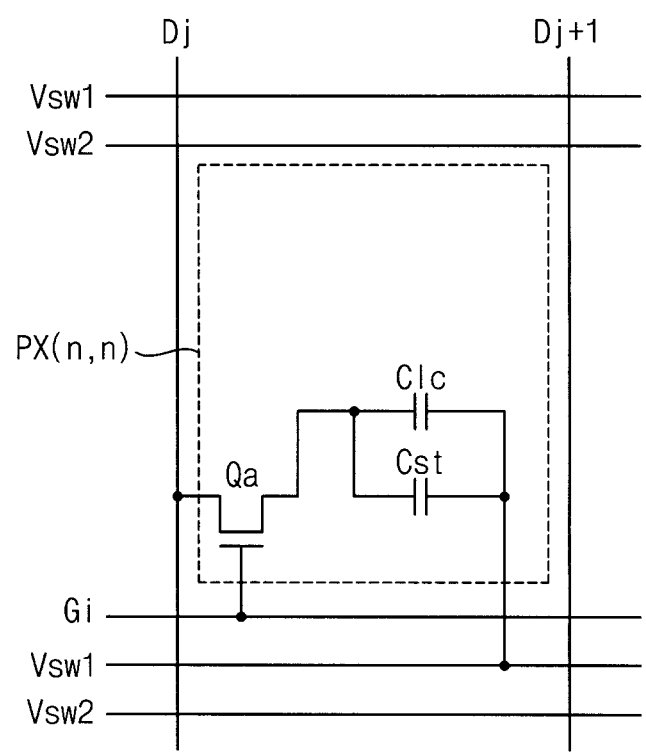
FIG. 19 is an equivalent circuit diagram illustrating pixels of the LCD device of FIG. 18.

FIG. 19 is an equivalent circuit diagram illustrating pixels of the LCD device of FIG. 18.

The LCD device of FIG. 19 is same as in FIG. 17 except that the first pixel PX(n, n) includes capacitors (not shown) which is formed by overlapping the first pixel electrode 591a and the first common electrode 591c with the first and second data lines 571a and 571b. Thus, the same reference numerals will be used to refer to the same or like parts as those described in FIG. 17 and any further explanation concerning the above elements will be omitted.

Referring to FIGS. 17 to 19, the voltages having opposite polarities are respectively applied to the data lines adjacent to each other, so that the parasite capacitance generated by each of the data lines may be removed. Thus, the voltages applied to the data lines may be hardly changed.

Figure 20:
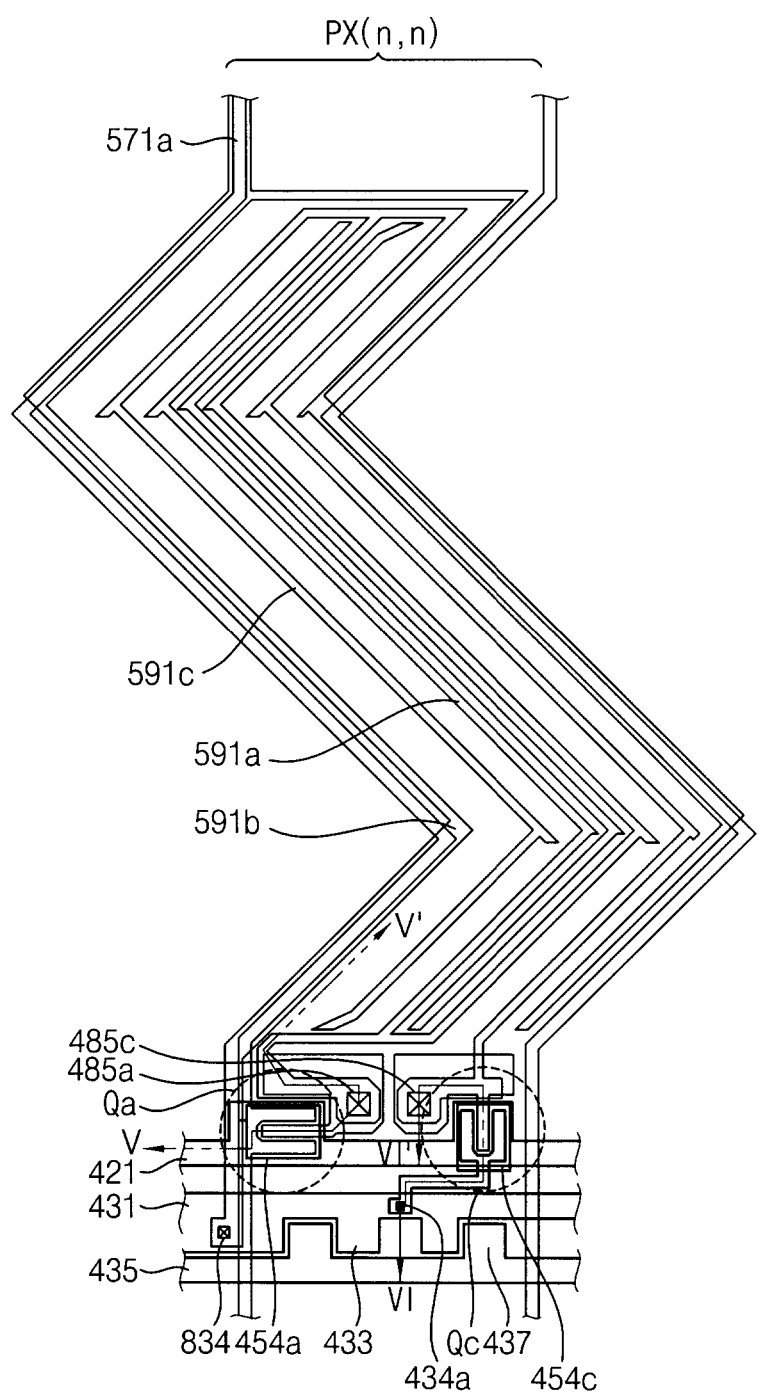
FIG. 20 is a plan view illustrating an LCD device in accordance with still another embodiment of the present invention.

FIG. 20 is a plan view illustrating an LCD device in accordance with still another embodiment of the present invention.

Plan views and cross-sectional views illustrating the LCD device of FIG. 20 is same as the plan views and the cross-sectional views illustrating the LCD device of FIG. 9, except that the second common electrode 591b is formed on the same layer as the first pixel electrode 591a and the first common electrode 591c corresponding to the first pixel PX(n, n), the first pixel electrode 591a and the first common electrode 591c do not partially overlaps with the first and second data lines 571a and 571b, and the second common electrode 591b partially overlap with the first and second data lines 571a and 571b. Thus, the same reference numerals will be used to refer to the same or like parts as those described in FIG. 9 and any further explanation concerning the above elements will be omitted.

Figure 21:
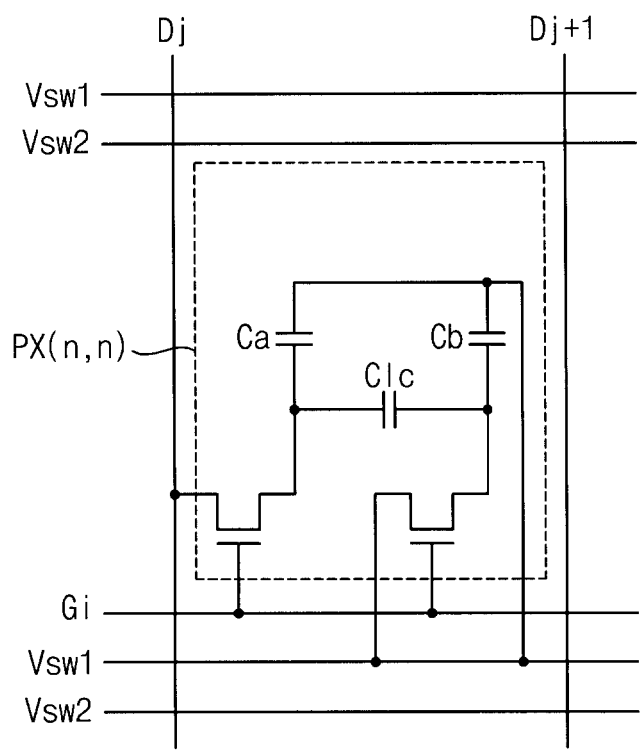
FIG. 21 is an equivalent circuit diagram illustrating pixels of the LCD device of FIG. 20.
Figure 22:
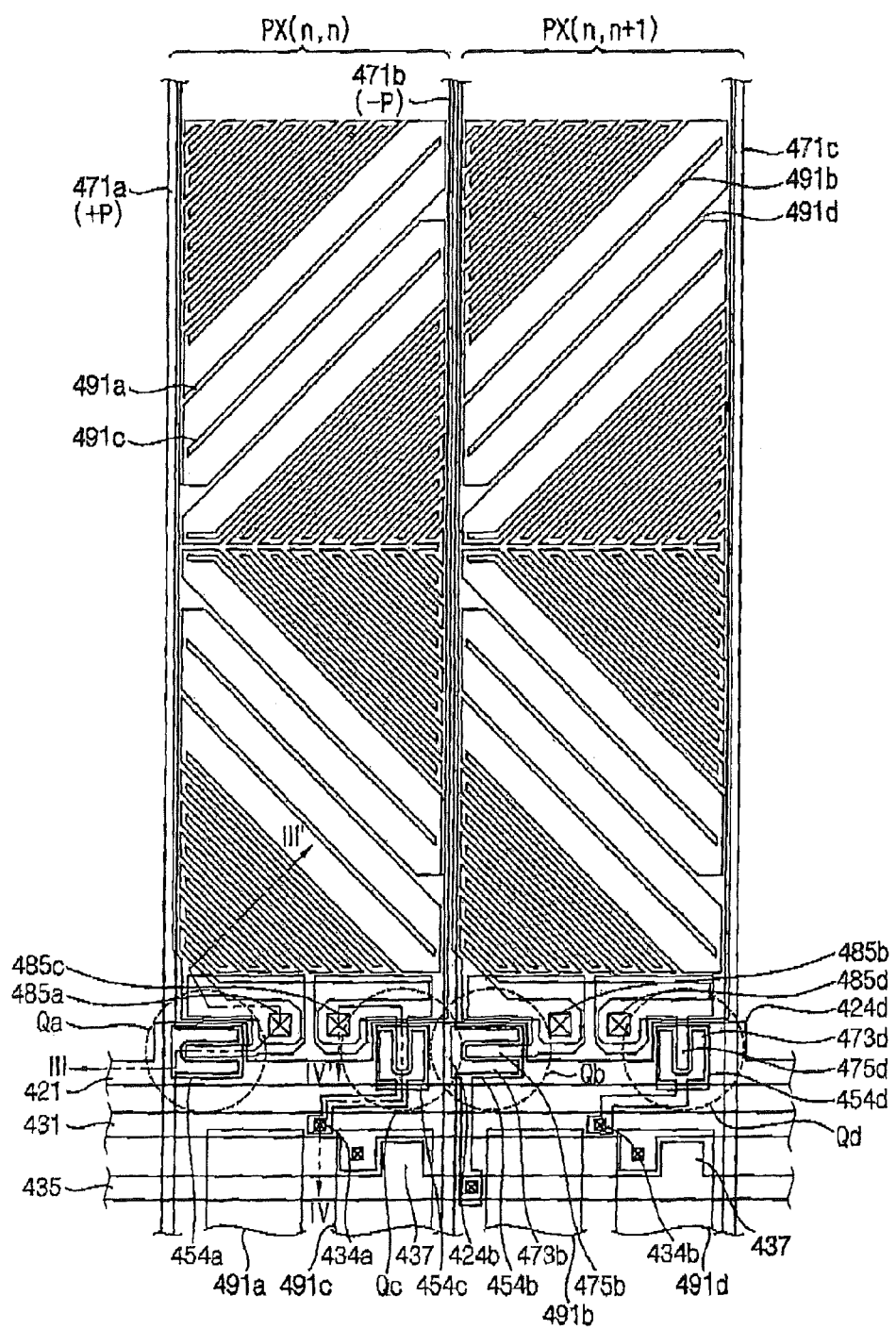
FIG. 22 is a plan view illustrating an LCD device in accordance with the equivalent circuit diagram of FIG. 13.

FIG. 21 is an equivalent circuit diagram illustrating pixels of the LCD device of FIG. 20.

The LCD device of FIG. 21 is same as in FIG. 19 except that the LCD device includes capacitors formed by overlapping the second common electrode 591b with the first and second data lines 571a and 571b, and the first and second dummy liquid crystal capacitors Ca and Cb formed by overlapping the second common electrode 591b with the first pixel electrode 591a and the first common electrode 591c. Thus, the same reference numerals will be used to refer to the same or like parts as those described in FIG. 19 and any further explanation concerning the above elements will be omitted.

Referring to FIGS. 19 to 21, the voltages having the opposite polarities are respectively applied to the data lines adjacent to each other, so that the parasite capacitance generated by each of the data lines may be removed. Thus, the voltages applied to the data lines may be hardly changed.

In addition, the third switching elements Qc of the adjacent pixels are alternately connected to the first and second swing voltage lines Vsw1 and Vsw2 at every adjacent pixel, so that the dot inversion may be performed.

According to the present embodiment, the pixel electrode 791a and the common electrode 791b in the pixel region are extended in various directions, so that liquid crystal molecules of the liquid crystal layer 300 may be aligned in various directions.

According to some example embodiments of the present invention, the range of the pixel voltage difference is increased by the power lines receiving the various voltages, so that light transmittance of the array substrate may be increased.

Also, the storage capacitors are formed using the power lines, so that opening ratio of the array substrate is increased.

In addition, a parasite capacitor that may be generated in the data lines by overlapping between the data lines and the pixel electrodes receiving different voltages may be prevented, so that image display quality of the array substrate may be increased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. An array substrate comprising:
    a first pixel electrode forming a first capacitor with a first power line and a second capacitor with a second power line, the first power line and the second power lines extending along a gate line, the first and second power lines receiving voltages having different polarities, respectively, the first pixel electrode being electrically connected to a first data line;
    a second pixel electrode forming a fourth capacitor with the first power line and a fifth capacitor with the second power lines, the second pixel electrode being electrically connected to a second data line receiving a voltage having an opposite polarity to a voltage applied to the first data line;
    a first common electrode forming a third capacitor with the second power line, the first common electrode being electrically connected to the first power line; and
    a second common electrode forming a sixth capacitor with the first power line, the second common electrode being electrically connected to the second power line.

2. The array substrate of claim 1,
    third capacitor is substantially the same as a sum of capacitances of the first capacitor and the second capacitor, and
    sixth capacitor is substantially the same as a sum of capacitances of the fourth capacitor and the fifth capacitor.

3. The array substrate of claim 1, further comprising:
    a first switching element comprising a gate electrode connected to the gate line, a source electrode connected to the first data line and a drain electrode connected to the first pixel electrode;
    a second switching element comprising a gate electrode connected to the gate line, a source electrode connected to the second data line and a drain electrode connected to the second pixel electrode;
    a third switching element comprising a gate electrode connected to the gate line, a source electrode connected to the first power line and a drain electrode connected to the first common electrode; and
    a fourth switching element comprising a gate electrode connected to the gate line, a source electrode connected to the second power line and a drain electrode connected to the second common electrode.

4. The array substrate of claim 1, wherein a ground voltage and a power voltage are alternately applied to the first power line,
    the power voltage and the ground voltage are alternately applied to the second power line,
    when the ground voltage is applied to the first power line, the power voltage is applied to the second power line, and
    when the power voltage is applied to the first power line, the ground voltage is applied to the second power line.

* * * * *